US011459509B2

(12) United States Patent
Magrini et al.

(10) Patent No.: US 11,459,509 B2
(45) Date of Patent: Oct. 4, 2022

(54) CATALYTIC HOT-GAS FILTRATION OF BIOMASS PYROLYSIS VAPORS

(71) Applicant: Alliance for Sustainable Energy, LLC, Golden, CO (US)

(72) Inventors: Kimberly A. Magrini, Golden, CO (US); Braden Hamilton Peterson, Golden, CO (US); Chaiwat Engtrakul, Louisville, CO (US); Andrew Nolan Wilson, Denver, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 81 days.

(21) Appl. No.: 16/940,190

(22) Filed: Jul. 27, 2020

(65) Prior Publication Data

US 2021/0024829 A1   Jan. 28, 2021

Related U.S. Application Data

(60) Provisional application No. 62/878,841, filed on Jul. 26, 2019.

(51) Int. Cl.
| | | |
|---|---|---|
| *C10B 57/18* | (2006.01) | |
| *B01J 27/19* | (2006.01) | |
| *B01J 27/199* | (2006.01) | |
| *B01J 27/188* | (2006.01) | |
| *C10G 3/00* | (2006.01) | |

(Continued)

(52) U.S. Cl.
CPC .......... *C10B 57/18* (2013.01); *B01D 53/8681* (2013.01); *B01J 27/188* (2013.01); *B01J 27/19* (2013.01); *B01J 27/199* (2013.01); *C10B 53/02* (2013.01); *C10G 3/48* (2013.01); *B01D 2255/20723* (2013.01); *B01D 2255/20769* (2013.01); *B01D 2255/20776* (2013.01);

(Continued)

(58) Field of Classification Search
USPC ....... 422/168–177; 95/128–141; 96/144, 154
See application file for complete search history.

(56) References Cited

U.S. PATENT DOCUMENTS 4,176,085 A * 11/1979 Yoo ...................... B01J 31/1616
585/509
5,009,857 A * 4/1991 Haerle .................. F01N 3/0218
422/177

(Continued)

OTHER PUBLICATIONS

Alsbou et al., "Accelerated aging of bio-oil from fast pyrolysis of hardwood", Energy Fuels, Apr. 2014, vol. 28, No. 5, p. 3224-3235.

(Continued)

*Primary Examiner* — Nina Bhat
(74) *Attorney, Agent, or Firm* — Michael A. McIntyre; Alexandra M. Hall

(57) ABSTRACT

The present disclosure relates to a device that includes a filter element and a catalyst, where the filter element is configured to remove particulate from a stream that includes at least one of a gas and/or a vapor to form a filtered stream of the gas and/or the vapor, the catalyst is configured to receive the filtered stream and react a compound in the filtered stream to form an upgraded stream of the gas and/or the vapor, further including an upgraded compound, and both the filter element and the catalyst are configured to be substantially stable at temperatures up to about 500° C.

11 Claims, 18 Drawing Sheets

(51) Int. Cl.
  C10B 53/02 (2006.01)
  B01D 53/86 (2006.01)
(52) U.S. Cl.
  CPC .. B01D 2258/02 (2013.01); C10G 2300/1014 (2013.01); C10G 2300/70 (2013.01)

(56) References Cited

U.S. PATENT DOCUMENTS

| | | | | |
|---|---|---|---|---|
| 5,165,899 | A * | 11/1992 | Delaunay | B01D 53/945 428/605 |
| 7,625,529 | B2 * | 12/2009 | Ohno | B01D 39/2068 422/180 |
| 2006/0292336 | A1 * | 12/2006 | Ohno | C04B 35/117 428/116 |
| 2007/0283681 | A1 * | 12/2007 | Makkee | F01N 13/0097 60/299 |
| 2010/0071369 | A1 * | 3/2010 | Martin | F02C 3/26 60/680 |
| 2012/0189489 | A1 * | 7/2012 | Kwon | B01J 23/8892 977/773 |
| 2013/0149458 | A1 * | 6/2013 | Cai | C04B 41/87 427/140 |
| 2014/0050626 | A1 * | 2/2014 | Heidenreich | B01D 53/885 422/139 |
| 2015/0020490 | A1 * | 1/2015 | Okano | F01N 3/2832 502/439 |
| 2015/0152768 | A1 * | 6/2015 | Arulraj | B01J 29/18 428/117 |
| 2016/0032196 | A1 | 2/2016 | Abdullah et al. | |
| 2017/0320013 | A1 * | 11/2017 | Fernando | B01D 39/202 |
| 2018/0250665 | A1 * | 9/2018 | Castellino | B01D 53/8628 |
| 2019/0309455 | A1 * | 10/2019 | Cross | D04H 1/732 |

OTHER PUBLICATIONS

Anderson et al., "Bifunctional molybdenum polyoxometalates for the combined hydrodeoxygenation and alkylation of lignin-derived model phenolics", ChemSusChem, May 2017, vol. 10, No. 10, pp. 2226-2234.
Atia et al., "Dehydration of glycerol in gas phase using heteropolyacid catalysts as active compounds", Journal of Catalysis, 2008, vol. 258, pp. 71-82.
Baldwin et al., "Bio-oil stabilization and upgrading by hot gas filtration", Energy & Fuels, 2013, vol. 27, No. 6, pp. 3224-3238.
Byrne et al., "Effect of Cu doping on the anatase-to-rutile phase transition in TiO2 photocatalysts: Theory and experiments", Applied Catalysis B: Environmental, Jun. 2019, vol. 246, pp. 266-276.
Coan et al., "Phosphonic acid modifiers for enhancing selective hydrodeoxygenation over Pt catalysts: The role of the catalyst support.", Journal of Catalysis, Apr. 2019, vol. 372, pp. 311-320.
Dickerson et al., "Catalytic Fast Pyrolysis: A Review", Energies, 2003, vol. 6, pp. 514-538.
Evans et al., "Molecular characterization of the pyrolysis of biomass. 1. Fundamentals", Energy & Fuels, Mar./Apr. 1987, vol. 1, No. 2, pp. 123-137.
Evans et al., "Molecular characterization of the pyrolysis of biomass. 2. Applications", Energy & Fuels, Jul./Aug. 1987, vol. 1, No. 4, pp. 311-319.
"Gooty et al., ""Fractional Condensation of Bio-Oil Vapors""", A Thesis Submitted in Partial Fulfillment of the Requirements for the Degree of Master of Engineering Science (MESc), The School of Graduate and Postdoctoral StudiesThe University of Western OntarioLondon, Ontario, Canada, 2013, pp. 1-107".
Guda et al., "Catalytic pyrolysis of pinewood using metal oxide catalysts in an integrated reactor system", Biofuels, 2017, vol. 8, No. 5, pp. 527-536.
Huber et al., "Synthesis of transportation fuels from biomass: Chemistry, catalysts, and engineering", Chemical Reviews, Jun. 2006, vol. 106, No. 9, pp. 4044-4098.

Iisa et al., "Production of low-oxygen bio-oil via ex situ catalytic fast pyrolysis and hydrotreating", Fuel, Nov. 2017, vol. 207, pp. 413-422.
Krutof et al., "Upgrading of biomass sourced pyrolysis oil review: focus on co-pyrolysis and vapour upgrading during pyrolysis", Biomass Converion and Biorefinery, Jul. 2018, vol. 8, No. 3, pp. 775-787.
Luo et al., "In-situ and ex-situ upgrading of pyrolysis vapors from beetle-killed trees", Fuel, 2016, vol. 166, pp. 367-375.
Lu et al., "Promotional effect of Ti doping on the ketonization of acetic acid over a CeO2 catalyst", RSC Advances, 2017, vol. 7, No. 36, pp. 22017-22026.
Lu et al. "Catalytic hot gas filtration for tailoring vapor-phase 3 chemistry of fast pyrolysis bio-oils", Catalysts, 2018, vol. 8, No. 643, pp. 1-11.
Lu et al. "Acetic Acid/Propionic Acid Conversion on Metal Doped Molybdenum Carbide Catalyst Beads for Catalytic Hot Gas Filtration", Catalysts, 2018, vol. 8, No. 643, pp. 1-8.
Mante et al., "Pilot-scale catalytic fast pyrolysis of loblolly pine over γ-Al2O3 catalyst", Fuel, Feb. 2018, vol. 214, No. 15, pp. 569-579.
Nacken et al., "Performance of a catalytically activated ceramic hot gas filter for catalytic tar removal from biomass gasification gas", Applied Catalysis B Environmental, May 2009, vol. 88, Nos. 3-4, pp. 292-298.
Nair et al., "Production of guaiacols via catalytic fast pyrolysis of alkali lignin using titania, zirconia and ceria", Journal of Analytical and Applied Pyrolysis, Apr. 2016, vol. 119, pp. 31-39.
Mante et al., "Selective defunctionalization by TiO2 of monomeric phenolics from lignin pyrolysis into simple phenols", Bioresource Technology, Nov. 2013, vol. 148, pp. 508-516.
Mukarakate et al., "Real-time monitoring of the deactivation of HZSM-5 during upgrading of pine pyrolysis vapors", Green Chemistry, 2014, vol. 16, No. 3, pp. 1444-1461.
Mukarakate et al., "Upgrading biomass pyrolysis vapors over β-zeolites: role of silica-to-alumina ratio", Green Chemistry, 2014, vol. 16, No. 12, pp. 4891-4905.
Mukarakate et al., "Catalytic fast pyrolysis of biomass: The reactions of water and aromatic intermediates produces phenols", Green Chemistry, 2015, vol. 17, No. 2, pp. 4217-4227.
Murugappan et al., "Supported molybdenum oxides as effective catalysts for the catalytic fast pyrolysis of lignocellulosic biomass", Green Chemistry, 2016, vol. 18, No. 20, pp. 5548-5557.
Oasmaa et al., "Acidity of biomass fast pyrolysis bio-oils", Energy Fuels, 2010, vol. 24, No. 12, pp. 6548-6554.
Parry et al., "An infrared study of pyridine adsorbed on acidic solids. Characterization of surface acidity.", Journal of Catalysts,1963, vol. 2, pp. 371-379.
Peterson et al., "Catalytic Hot-Gas Filtration with a Supported Heteropolyacid Catalyst for Preconditioning Biomass Pyrolysis Vapors", ACS Sustainable Chem Eng., 2019, vol. 7, pp. 14941-14952.
Pacchioni, "Ketonization of carboxylic acids in biomass conversion over TiO2 and ZrO2 surfaces: A DFT perspective", ACS Catalysis, 2014, vol. 4, No. 9, pp. 2874-2888.
Pham et al., "Ketonization of carboxylic acids: Mechanisms, catalysts, and implications for biomass conversion", ACS Catalalysis, 2013, vol. 3, No. 11, pp. 2456-2473.
Rahman et al., "Catalytic fast pyrolysis of biomass over zeolites for high quality bio-oil—A review", Fuel Processing Technology, 2018, vol. 180, pp. 32-46.
Ruddy et al., "Recent advances in heterogeneous catalysts for bio-oil upgrading via "ex situ catalytic fast pyrolysis": catalyst development through the study of model compounds", Green Chemistry, 2014, vol. 16, pp. 454-490.
Saidi et al., "Upgrading of lignin-derived bio-oils by catalytic hydrodeoxygenation", Energy & Environmental Science, 2014, vol. 7, No. 1, pp. 103-129.
Shetty et al., "Structural properties and reactivity trends of molybdenum oxide catalysts supported on zirconia for the hydrodeoxygenation of anisole", ACS Sustainable Chemistry & Engineering, Apr. 2017, vol. 5, No. 6, pp. 5293-5301.

(56) References Cited

OTHER PUBLICATIONS

Tomasi Morgano et al., "Screw pyrolysis with integrated sequential hot gas filtration", Journal of Analytical and Applied Pyrolysis, May 2015, vol. 113, pp. 216-224.
Turan et al., "Development of calcium silicate-based catalytic filters for biomass fuel gas reforming", International Journal of Energy Research, Jan. 2019, vol. 43, No. 3, pp. 1217-1231.
Wang et al., "Reactive catalytic fast pyrolysis of biomass to produce high-quality bio-crude", Green Chemistry, 2017, vol. 19, No. 14, pp. 3243-3251.
Williams et al., "The influence of catalyst type on the composition of upgraded biomass pyrolysis oils", Journal of Analytical and Applied Pyrolysis, 1995, vol. 31, pp. 39-61.
Yung et al., "Restoring ZSM-5 performance for catalytic fast pyrolysis of biomass: Effect of regeneration temperature", Catalysis Today, Feb. 2019, vol. 323, pp. 76-85.
Zhang et al., "Conversion of pyrolytic lignin to aromatic hydrocarbons by hydrocracking over pristine $MoO_3$ catalyst", Journal of Analytical and Applied Pyrolysis, 2018, vol. 135, pp. 60-66.
Zhao et al., "Oxygen-deficient titania as alternative support for Pt catalysts for the oxygen reduction reaction", Journal of Energy Chemistry, 2014, vol. 23, pp. 701-707.

\* cited by examiner

CATALYTIC HOT-GAS FILTRATION OF BIOMASS PYROLYSIS VAPORS

CROSS-REFERENCE TO RELATED APPLICATIONS

This application claims the benefit of U.S. Provisional Application No. 62/878,841 filed on Jul. 26, 2019, the contents of which are incorporated herein by reference in their entirety.

CONTRACTUAL ORIGIN

This invention was made with United States government support under Contract No. DE-AC36-08GO28308 awarded by the United States Department of Energy. The government has certain rights in this invention.

BACKGROUND

Pyrolysis of biomass feedstocks is a first step in decomposing the feedstocks into vapors which can then be condensed into useful bio-oils and biofuel products. However, biomass feedstock-derived fast pyrolysis vapors often contain char, alkali particulates, and aerosols that destabilize the condensed bio-oils. Additionally, a significant portion of the biomass feedstock-derived pyrolysis vapors have reactive oxygen moieties such as acid carbonyls (e.g. acetic acid), which tend to negatively impact the pyrolysis process due to their corrosive properties. These corrosive acids promote coking reactions in the pyrolysis vapors (leading to carbon loss) and poor bio-oil stability and compatibility in the condensed liquids, limiting storage opportunities and further conversion processes. Therefore, there remains a need for improved systems and methods for processing pyrolysis-derived vapors and oils.

SUMMARY

An aspect of the present disclosure is a device that includes a filter element and a catalyst, where the filter element is configured to remove particulate from a stream that includes at least one of a gas and/or a vapor to form a filtered stream of the gas and/or the vapor, the catalyst is configured to receive the filtered stream and react a compound in the filtered stream to form an upgraded stream of the gas and/or the vapor, further including an upgraded compound, and both the filter element and the catalyst are configured to be substantially stable at temperatures up to about 500° C. In some embodiments of the present disclosure, the filter element may include at least one of a ceramic and/or a metal.

In some embodiments of the present disclosure, the ceramic may include at least one of an oxide, a carbide, a nitride, and/or a phosphide. In some embodiments of the present disclosure, the oxide may include at least one of an alumina, a titania, a zirconia, and/or a silica. In some embodiments of the present disclosure, the carbide may include at least one of silicon, titanium, and/or zinc. In some embodiments of the present disclosure, the catalyst may include at least one of a heteropolyacid, a ring-opening catalyst, a metal oxide, a zeolite, platinum, palladium, iridium, and/or rhodium. In some embodiments of the present disclosure, the catalyst may be positioned on a support.

An aspect of the present disclosure is a system that includes a catalytic hot-gas filter (CHGF) configured to receive an inlet stream that includes at least one of a gas or a vapor, where the CHGF includes a filter element and a catalyst, the filter element is configured to remove particulate from a stream that includes at least one of a gas or a vapor to form a filtered stream of the gas or the vapor, the catalyst is configured to receive the filtered stream and react a compound in the filtered stream to form an upgraded stream of the gas or the vapor, that includes an upgraded compound, and both the filter element and the catalyst are configured to be substantially stable at temperatures up to about 500° C. In some embodiments of the present disclosure, the system may further include a pyrolyzer configured to convert a feed stream to the inlet stream comprising an untreated pyrolysis vapor.

In some embodiments of the present disclosure, the pyrolyzer may include at least one of a fluidized bed, a moving-bed, a circulating fluidized bed, a bubbling bed, an auger/screw system, an ablative reactor, a vacuum reactor, and/or an entrained flow reactor.

In some embodiments of the present disclosure, the system may further include a fractional condensation train (FCT) that includes, in series, a passive-cooler condenser, an electrostatic precipitator, an aqueous condenser, and a coalescing filter, where the FCT is configured to receive the upgraded stream to produce a pyrolysis oil.

An aspect of the present disclosure is a method for treating pyrolysis vapors, where the method includes filtering an inlet stream that includes at least one of a gas or a vapor, where the filtering removes a solid from the inlet stream to form a filtered stream that includes the gas or the vapor, and reacting the filtered stream in the presence of a catalyst to form an upgraded stream that includes the gas or the vapor. In some embodiments of the present disclosure, the method may further include, prior to the filtering, pyrolyzing a feed stream to produce the inlet stream.

In some embodiments of the present disclosure, the method may further include, after the reacting, condensing at least a portion of the upgraded stream to produce a pyrolysis oil. In some embodiments of the present disclosure, the reacting may be performed in the presence of at least one of hydrogen ($H_2$) or water.

An aspect of the present disclosure is a composition that includes a catalyst positioned on a support, where the catalyst includes a polyoxometalate, the support includes at least one of a metal oxide, a metal carbide, a metal nitride, a metal phosphide, and/or a zeolite, and the catalyst is present at a concentration between about 5 wt % and about 15 wt %. In some embodiments of the present disclosure, the polyoxometalate may include at least one of $[M_6O_{19}]^{2-}$, $[XM_{12}O_{40}]^{n-}$, and/or $[X_2M_{18}O_{62}]^{n-}$, M includes a transition metal, X includes at least one of phosphorus, silicon, aluminum, cobalt, germanium, arsenic, and/or boron, and n is an integer.

In some embodiments of the present disclosure, the polyoxometalate may include at least one of $H_3PMo_{12}O_{40}$, $H_5PMo_{10}V_2O_{40}$, and/or $H_3PW_{12}O_{40}$. In some embodiments of the present disclosure, the metal oxide may include at least one of ZnO, CaO, CuO, MgO, NiO, $TiO_2$, $ZrO_2$, $MnO_2$, $MoO_3$, $Al_2O_3$, $Fe_2O_3$, $CeO_2$, $La_2O_3$, $Nd_2O_3$, and/or $Pr_6O_{11}$. In some embodiments of the present disclosure, the support may include at least one of $Mo_2C$, $W_2C$, $Mo_2N$, $W_2N$, and/or NiP.

BRIEF DESCRIPTION OF THE DRAWINGS

Exemplary embodiments are illustrated in the referenced figures. It is intended that the embodiments and figures disclosed herein are to be considered illustrative rather than limiting.

Figure 1:
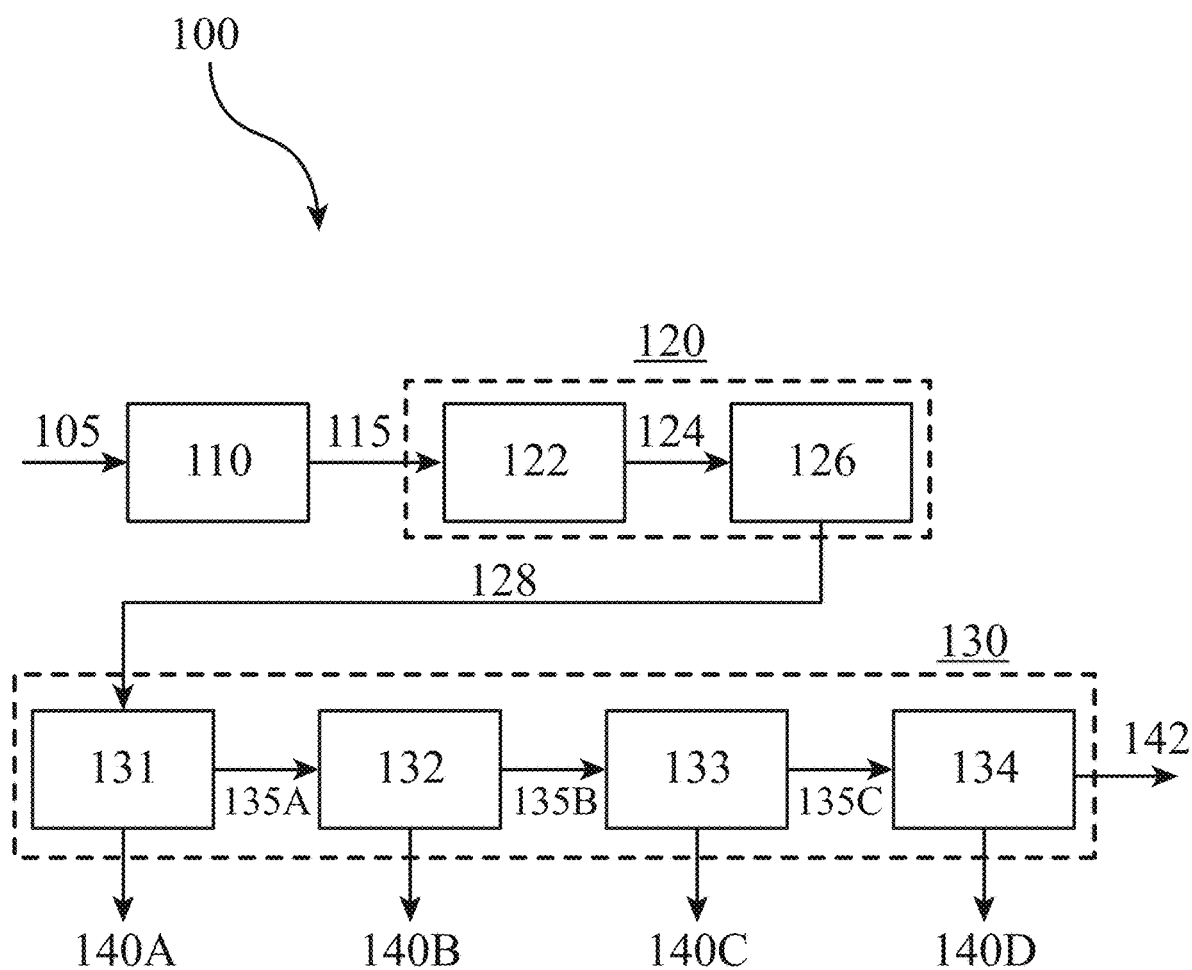
FIG. 1 illustrates a system for upgrading pyrolysis vapors, according to some embodiments of the present disclosure.

REFERENCE NUMBERS 100 system
105 feed stream (e.g. biomass)
110 pyrolyzer
115 untreated pyrolysis vapor
120 catalytic hot-gas filter (CHGF)
122 hot-gas filter unit
124 filtered pyrolysis vapor
126 hot-gas catalyst unit
128 upgraded pyrolysis vapor
130 fractional condensation train (FCT)
131 passive-cool condenser
132 electrostatic precipitator (ESP)
133 aqueous condenser
134 coalescing filter
135 intermediate pyrolysis vapor
140 pyrolysis oil
142 exhaust
200 housing
210 filter element
220 catalyst
230 inlet
240 outlet
250 cap
260 plug
270 outer annular space
280 inner space
510 feed drive motor
515 carrier gas
525 cyclone
535 valve
540 stream to downstream processing
545 scrubber nozzle
550 scrubber system
555 liquid pyrolysis product
560 quench fluid pump
565 exhaust
575 control valve
580 molecular beam mass-spectroscopy (MBMS) slipstream
585 backpressure regulator
587 volumetric flow meter
590 exhaust
595 gas bag sampling
915 pressure gauge
925 product sight-glass
930 product sampling valves
940 thermocouples
955 data acquisition system
975 effluent filter
980 effluent oxygen limit switch
995 electrostatic precipitator power and control unit

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Disclosed herein are methods and systems that combine a catalyst with a filter that, among other things, enable the tailoring of pyrolysis vapor to specific pyrolysis oil compositions and/or oils having specific physical properties and/or performance characteristics. Referred to herein as a catalytic hot-gas filter (CHGF), a CHGF may among other things, combine filtration with catalysis to both remove reactive alkali and char particulate from a gas and/or vapor stream, while also catalytically upgrading at least one of the chemical components contained in the stream. For example, biomass-derived pyrolysis vapors may be passed through a CHGF to remove ash and/or char and improve the vapor composition, which can subsequently improve downstream upgrading. As described herein, a CHGF may prevent downstream catalysts from fouling and allow for improved and/or less frequent catalyst regeneration. By removing char and alkali/alkaline particulates from pyrolysis vapors a CHGF may also increase vapor stability and quality, leading to improved downstream upgrading of the vapors. Also described herein, the upgraded pyrolysis vapors from a CHGF may be further processed using a fractional condensation train (FCT) to, among other things, selectively remove and/or fractionate the upgraded pyrolysis oil into one or more desired pyrolysis oil product streams.

For these reasons, the present disclosure relates to systems and methods that include the use of a CHGF to upgrade pyrolysis vapors and/or prepare pyrolysis vapors for downstream upgrading. In some embodiments of the present disclosure, a CHGF may be utilized to perform partial deoxygenation of a vapor stream followed by a FCT used downstream of the CHGF to perform fractional condensation of the upgraded pyrolysis vapor to, among other things, control the composition of the biomass-derived products for downstream upgrading and/or other processing.

As described herein, a CHGF with or without a FCT may improve vapor composition by removing reactive oxygen moieties, which, among other things, can protect downstream upgrading catalysts from fouling. As used herein, upgrading refers to both vapor phase upgrading (such as ex situ catalytic fast pyrolysis) and condensed phase upgrading (such as hydrotreating and/or coprocessing). In some embodiments of the present disclosure, a CHGF providing both filtration and catalysis, may be constructed as a single unit operation for conditioning pyrolysis vapors for downstream upgrading processes. In some embodiments of the present disclosure, a CHGF may include a first unit operation for filtration that is coupled to a second separate unit operation that completes the catalytic upgrading.

FIG. 1 illustrates a system 100 for upgrading, among other things, biomass-derived pyrolysis vapor to mixtures and compounds that are more valuable and/or more easily processed in down-stream unit operations configured to further upgrade the mixtures and compounds to more valuable materials. As described herein, such a system 100 for converting materials, e.g. biomass, to valuable down-stream products may include three important features: a pyrolyzer 110, a catalytic hot-gas filter (CHGF) 120, and/or a fractional condensation train (FCT) 130. The exemplary system 100 shown in FIG. 1 includes a pyrolyzer 110 configured to receive a feed stream 105 to convert the feed stream 105, by pyrolysis, to a vapor which often contains a complex mixture of chemical compounds having a wide range of molecular weights and functionality. This product stream from the pyrolyzer 110 is referred to herein as untreated pyrolysis vapor 115.

Among other things, a feed stream 105 may include a wide variety of biomass-derived and/or biomass-containing materials including waste products and/or plant-matter specifically farmed for the purpose of generating feedstock for pyrolysis systems dedicated to manufacture useful chemicals, fuels, polymers, and/or resins. Thus, in some embodiments of the present disclosure, a feed stream 105 may include at least one of an agricultural waste (e.g. corn stover, wheat straw, bagasse, etc.), a wood and/or forest waste, a residential waste, and/or biomass derived from municipal solid waste (MSW). Plant material may include tree material (e.g. hardwoods and/or softwoods) and/or a variety of grasses such as Miscanthus and switchgrass.

The specifics of a pyrolyzer 110 may depend on the type of feed stream 105 available, the desired target product distribution contained in the resultant untreated pyrolysis vapor 115, among other process, product, and/or local limitations and/or criteria. Examples of suitable pyrolyzers 110 include fluidized bed reactors, moving-bed systems, rotary ablative reactors, screw/auger pyrolyzers, bubbling and circulating fluidized bed systems, and/or entrained flow pyrolyzers. In some embodiments of the present disclosure, a feed stream 105 may be heated to a pyrolysis temperature between about 400° C. and about 600° C. at a system pressure between about ambient pressure (e.g. about 1 atmosphere) and about 20 bar. A feed stream 105 may have a residence time within the pyrolyzer 110 between about 1 second and about 10 seconds. In some embodiments of the present disclosure, water (i.e. steam) or hydrogen (i.e. hydro-pyrolysis) may be cofed to the pyrolyzer 110 with the feed stream 105.

The resultant untreated pyrolysis vapor 115 produced by the pyrolyzer 110 may be composed of a large number of chemical species ranging in size, functionality, and reactivity, such as water, carbon oxides ($CO_x$), hydrogen, anhydrosugars, ketones, acids, aldehydes, phenols, methoxyphenols, and pyrolytic lignin (lignin-derived oligomers). In addition, untreated pyrolysis vapor 115 typically contains solid matter entrained in the vapor, such as ash, char, alkali species (K, Ca, Na), sulfur species (thiophene, hydrogen disulfide), and/or tar aerosols.

For example, among other reactions, the catalytic elements of a CHGF may enable catalytic deoxygenation reactions (e.g. decarboxylation) that can convert corrosive acids to more desirable products. The ketonization of carboxylic acids is a feasible reaction pathway for upgrading biomass-derived pyrolysis vapors and suppressing the formation of corrosive acids while achieving additional carbon-carbon coupling chemistry, which can result in compounds having higher heating values. Decarboxylation and ketonization reactions tend to remove oxygen from carboxylic acids in the form of $CO_2$. This loss of carbon lowers the carbon efficiency of the conversion of biomass to liquid fuel products. To off-set these losses, in some embodiments of the present disclosure, hydrodeoxygenation may be achieved catalytically in a CHGF to eliminate water and retain carbon. Hydrodeoxygenation (HDO) further presents an opportunity for incorporating hydrogen into end-products prior to hydrotreating, thereby mitigating downstream hydrotreating severity. In some embodiments, to expand the types of catalysts utilized in a CHGF and to achieve the desired chemistry, pyrolysis vapors may be preconditioned with upstream separation processes before downstream filtration and catalytic upgrading is performed in the CHGF.

Thus, among other things, the present disclosure provides systems and methods that accomplish filtration, e.g. capture char and alkali metals, while simultaneously performing upgrading reactions, e.g. partial deoxygenation and/or alkylation (i.e. carbon-carbon coupling) on pyrolysis vapors. Among other things, combining hot-gas filtration with a catalytic component into a single unit operation has the potential to extend catalyst lifetime, enable efficient downstream processing, and provide low CapEx bio-oil stabilization, while preserving carbon for downstream upgrading and allowing the production of carbon-carbon coupled species that can be used to tailor down-stream fuel end-product properties. In addition, the use of CHGF as described herein may eliminate cyclone separators typically used to remove entrained solids in fast pyrolysis vapors, further reducing capital costs.

Referring again to FIG. 1, for these reasons, among others, untreated pyrolysis vapor 115 may be directed to a CHGF 120, resulting in an upgraded pyrolysis vapor 128 containing valuable compounds and/or a stream that is more easily processed in down-stream unit operations. As the name implies, a CHGF includes two elements in series, a hot-gas filter unit 122 and a hot-gas catalyst unit 126. As shown in FIG. 1, an untreated pyrolysis vapor 115 may be directed to the hot-gas filter unit 122 of a CHGF 120, resulting in the removal of at least a portion of the solids (e.g. ash, char, etc.) contained in the untreated pyrolysis vapor 115, resulting in the formation of a filtered pyrolysis vapor 124. This filtered pyrolysis vapor 124 may then be directed to the hot-gas catalytic unit 126, wherein at least one compound contained within the filtered pyrolysis vapor 124 is converted (i.e. upgraded) to a more valuable compound and/or a compound that is more easily processed in downstream operations. Thus, the combination of the hot-gas filter unit 122 and the hot-gas catalyst unit 126 of the CHGF 120 converts the untreated pyrolysis vapor 115 to an upgraded pyrolysis vapor 128 characterized by numerous improvements.

In some embodiments of the present disclosure, the pyrolysis vapor may be further processed by directing the upgraded pyrolysis vapor 128 to an FCT 130. As described herein, the fractional condensation of biomass pyrolysis vapors using an FCT 130 may be utilized to alter the composition of the condensed phase or phases by removing water, fouling agents, and/or value-added chemicals. Fractional condensation permits additional tailoring of vapors for downstream upgrading through the removal of reactive and/or high molecular weight components that contribute to catalyst fouling and bio-oil instability. Moreover, the selective removal of value-added components, such as polymer precursors (e.g. phenols, alkylphenols, methoxyphenols, cyclopentenones), by fractional condensation presents an opportunity for offsetting capital costs within a CFP and/or hydrotreating process. In some embodiments of the present disclosure, a fractional condensation train may be utilized to provide additional tailoring of vapors for downstream upgrading. In some embodiments of the present disclosure, systems and methods may combine filtration and partial deoxygenation in a CHGF, followed by fractional condensation to control the composition of biomass-derived products for downstream upgrading processes.

Figure 5:
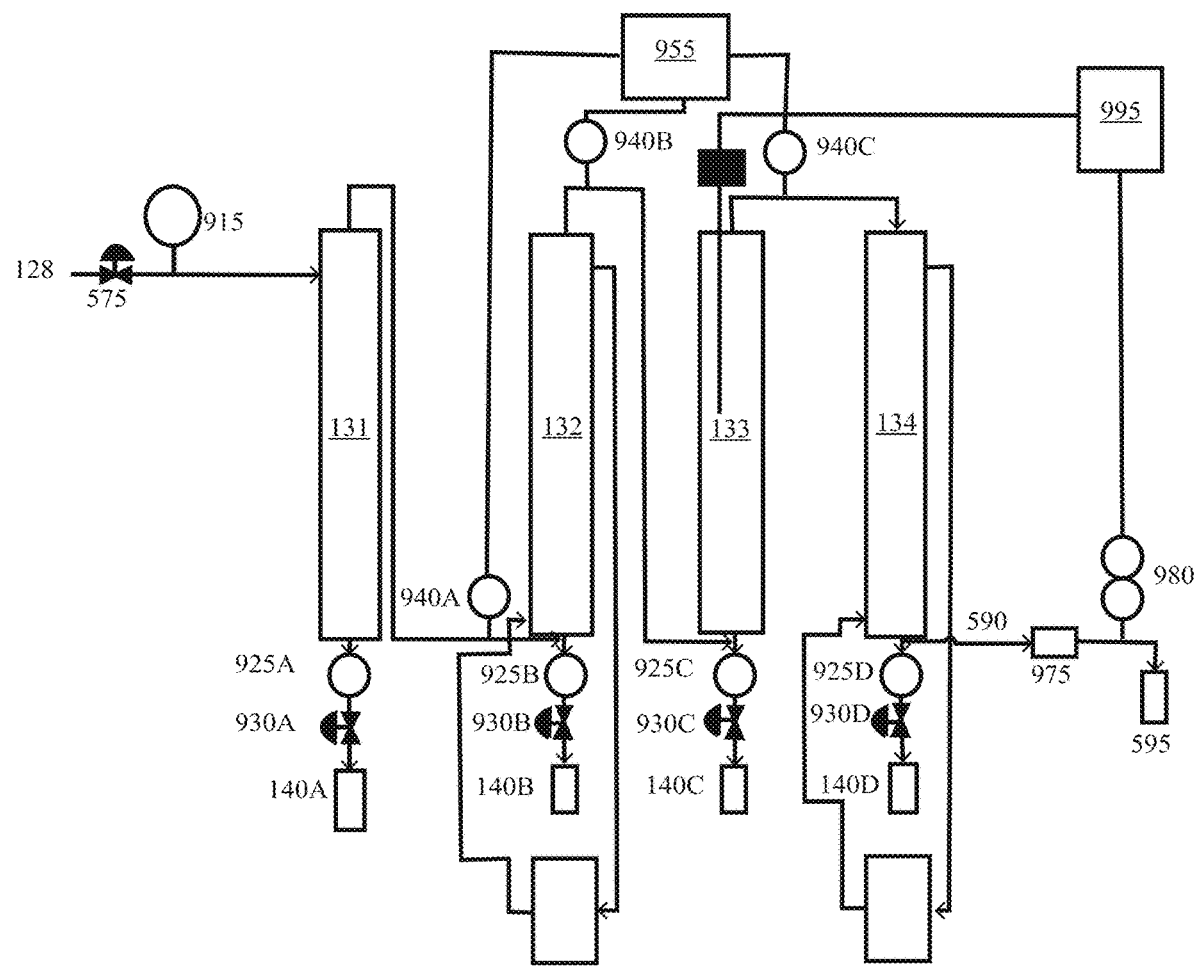
FIG. 5 illustrates a fractional condensation train (FCT) system, according to some embodiments of the present disclosure.

Fractional condensation is a strategy for separating liquid product(s) from vapor phase streams in a controlled, sequential process. The strategy can be used to separate selected compounds from an organic oil product (e.g. ketones, acids, and/or aldehydes), remove heavy oligomeric material, concentrate organic matter, separate the aqueous phase, and isolate co-products by process control. Bio-oil stability, and therefore oil quality, depends on the ability of reactive oxygen moieties (e.g. acid carbonyls) within the oil to promote aging reactions during storage. Since carbonyl compounds (e.g. aldehydes and/or ketones) and organic acids (e.g. acetic acid) are the main contributors to oil instability of fast pyrolysis oil, an FCT (staged condensation process) was coupled with the CHGF unit operation to reduce the content and distribution of these aging compounds within the organic liquid product. A schematic diagram of the FCT unit is shown in FIG. 5, which is described in more detail below.

Thus, in some embodiments of the present disclosure, a system 100 may include an FCT 130 that includes up to four separate unit operations arranged in series: a passive-cool condenser 131, an electrostatic precipitator (ESP) 132, an aqueous condenser 133, and a coalescing filter 134. Each of these unit operations of an FCT 130 may condense successively lower molecular weight species (e.g. lower boiling point species) from the pyrolysis vapor to produce a series of pyrolysis oil 140 products (140A, 140B, 140C, and 140D) and intermediate pyrolysis vapor 135 streams (135A, 135B, and 135C), resulting in a final exhaust 142 stream that may include non-condensables and/or any remaining low molecular weight pyrolysis products.

Figure 2A:
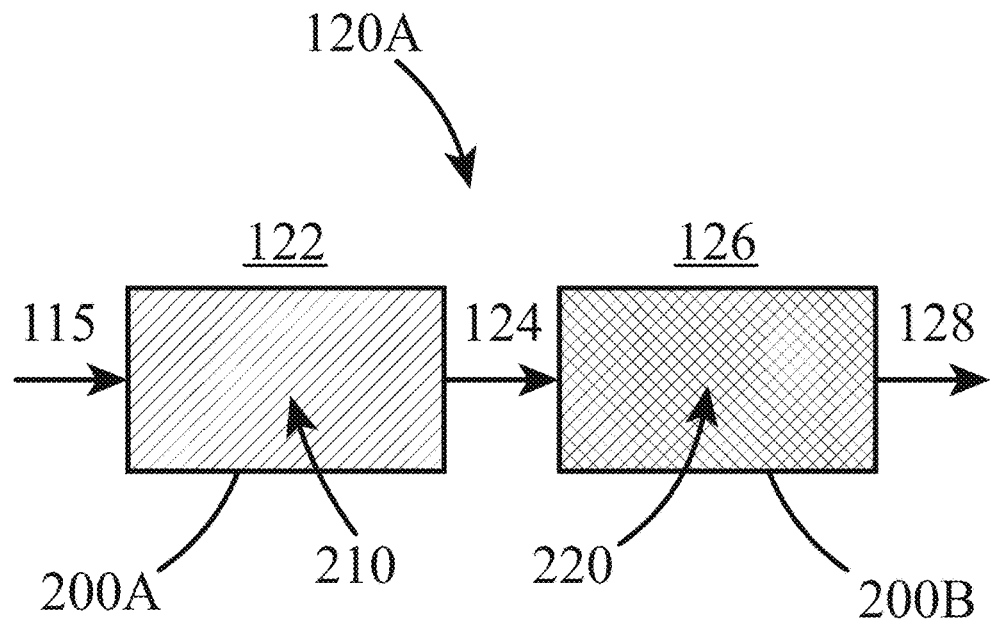
FIGS. 2A, 2B, 2C, and 2D illustrate catalytic hot-gas filters, according to some embodiments of the present disclosure.
Figure 2B:
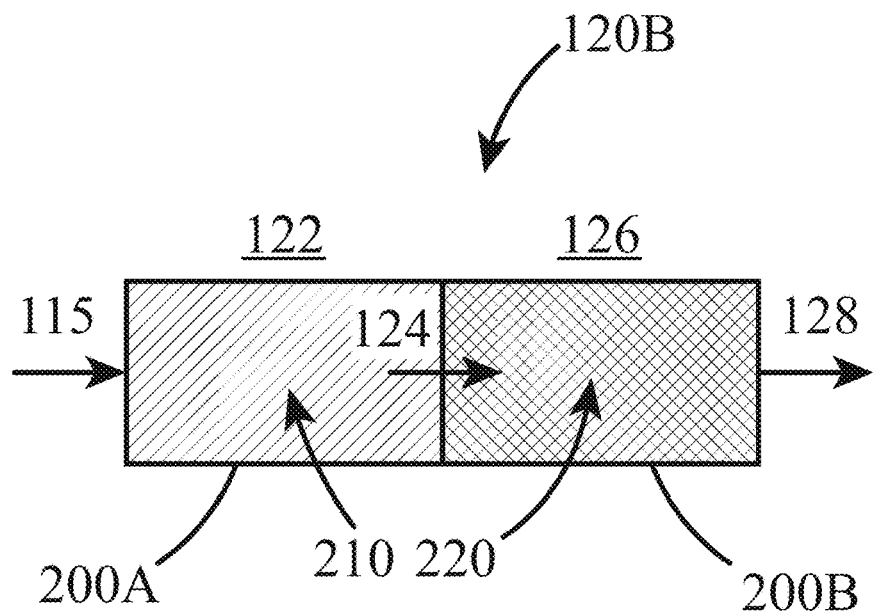

FIGS. 2A, 2B, 2C, and 2D illustrate aspects of a CHGF 120, according to some embodiments of the present disclosure. FIG. 2A illustrates, that in some embodiments of the present disclosure, a CHGF 120A may be designed such that a hot-gas filter unit 122 and a hot-gas catalyst unit 126 are positioned in series, but as separate unit operations, e.g. with each positioned within its own dedicated housing and connected by an intervening pipe. FIG. 2B illustrates, that in some embodiments of the present disclosure, a CHGF 120B may be designed such that a hot-gas filter unit 122 and a hot-gas catalyst unit 126 are positioned in series in the same unit operation, e.g. positioned within a single housing, where the hot-gas filter unit 122 and the hot-gas catalyst unit 126 may be in direct physical contact with each other and/or positioned adjacent to one another with an intervening material and/or gap between them. In some embodiments of the present disclosure, an intervening pipe, in addition to functioning as a standard product transfer pipe, may comprise and function as a separation membrane unit for selective separation of intermediate products (e.g. water, $CO_x$, olefins) and/or as an intermediate high-temperature condenser to condense high molecular weight foulant species prior to transfer of the filtered pyrolysis vapor 124 to the hot-gas catalyst unit 126.

Figure 2C:
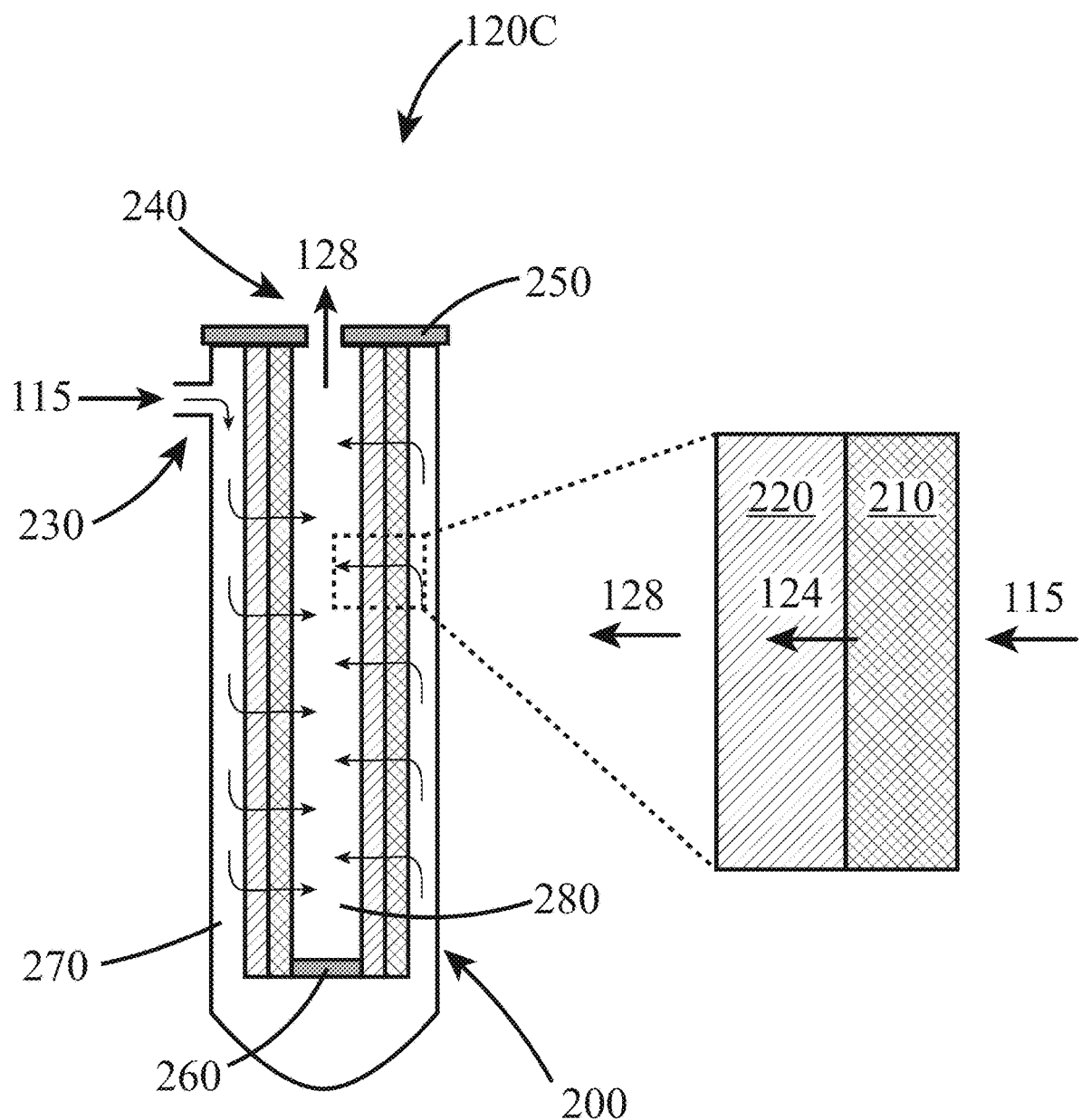
Figure 2D:
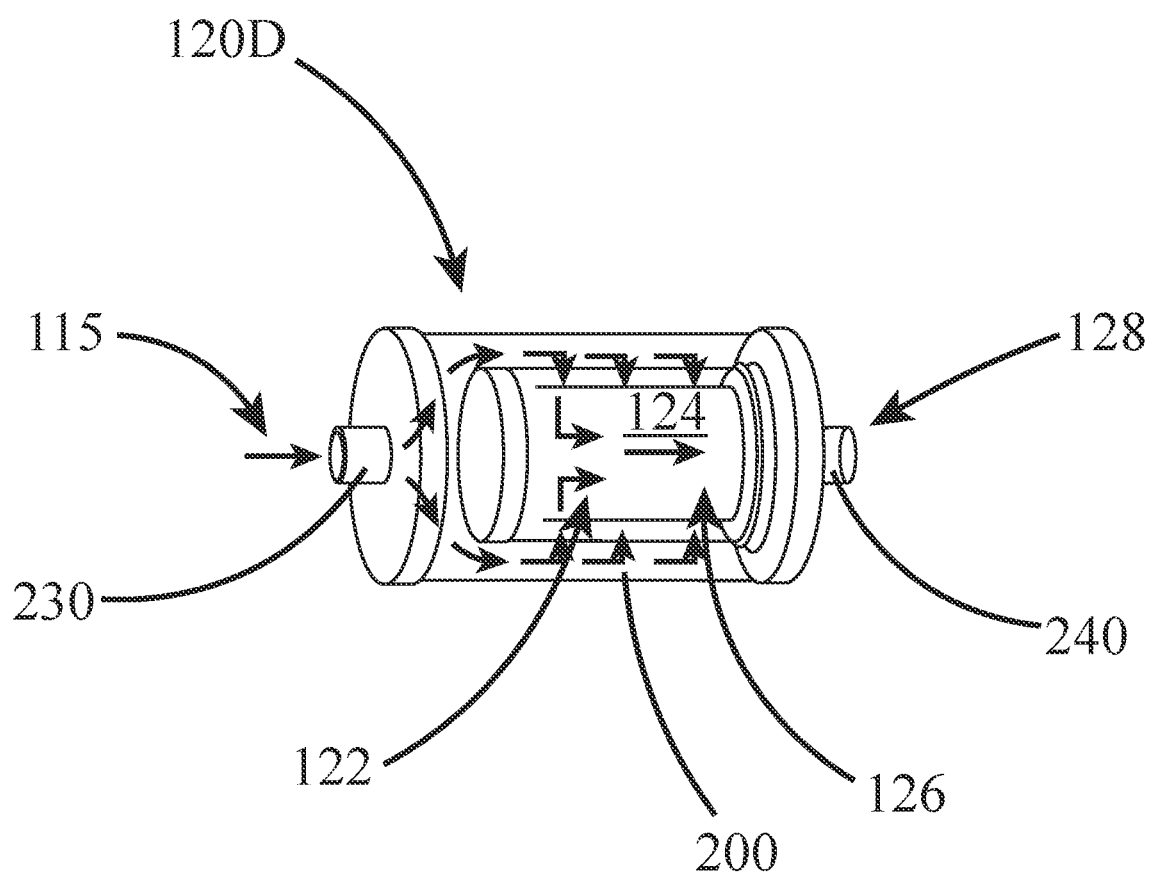

FIG. 2C illustrates a more specific example of the CHGF 120B illustrated in FIG. 2B. In this example of a CHGF 120C, the hot-gas filter unit 122 and the hot-gas catalyst unit 126 may be constructed as a single integrated unit, e.g. a cartridge, positioned within a single housing 200. In this example, the housing 200 includes an inlet 230, to which the untreated pyrolysis vapor 115 is directed, and an outlet 240 out of which the upgraded pyrolysis vapor 128 exits to be directed to down-stream processing; e.g. an FCT 130. From the inlet 230, the untreated pyrolysis vapor 115 may enter an outer annular space 270 such that the untreated pyrolysis vapor flows tangentially across an outer surface of the hot-gas filter unit 126. As a result of a pressure difference across the integrated hot-gas filter unit 122 and the hot-gas catalyst unit 126, the untreated pyrolysis vapor 128 may flow in a direction substantially perpendicular to the outer surface into the hot-gas filter unit 122, where it is filtered to remove particulate, resulting in a filtered pyrolysis vapor 124, which then flows through the hot-gas catalyst unit 126 to produce an upgraded pyrolysis vapor 128. The upgraded pyrolysis vapor 128 then flows into a lower pressure inner space 280 to exit the CHGF 120 through the outlet 240. In some embodiments of the present disclosure, a hot-gas filter unit 122 may be connected in series to a hot-gas catalyst unit 126 that includes at least one of a packed bed, a fluidized bed, and/or an annular catalyst bed for catalytic upgrading. Thus, the separate configuration illustrated in FIG. 2A, among other things, may allow a hot-gas catalyst unit 126 to be operated at different conditions (e.g. temperature, pressure, etc.) than a hot-gas filter unit 122. FIG. 2D illustrates another embodiment of a CHGF 120D with both the hot-gas filter unit 122 and the hot-gas catalyst unit 126 contained within a single housing 200.

Referring again to FIGS. 2A-2D, a hot-gas filter unit 122 may include at least one filter element 210. In some embodiments of the present disclosure, a filter element 210 may include, among other things, ceramic filter media and/or metallic filter media to remove particulates from the pyrolysis vapors onto the surfaces of the filter media. In some embodiments of the present disclosure, metallic or ceramic elements may be selected to capture particulates from the pyrolysis vapors to provide a clean filtered pyrolysis vapor 124 that can be condensed to a stable bio-oil (e.g. using an FCT) or further upgraded via downstream catalytic approaches to provide stable upgraded bio-oils as feedstocks for producing biogenic fuels and chemicals. In some embodiments of the present disclosure, a hot-gas filter element 210 may include a Pall DiaSchumalith® ceramic filter to capture the majority (in some cases>99%) of the particulates contained in an untreated pyrolysis vapor 115. However, this specific filter element 210 is provided for illustrative purposes and other filter types and/or filter elements may be used. Other filter elements may include at least one of a ceramic (e.g. silica; metal oxides such as alumina, titania, zirconia, and zinc oxide), a metal carbide such as TiC and ZnC, a metal (e.g. stainless steel, titanium, aluminum, carbon steel), and/or combinations thereof (e.g. alumina on SiC) with the requirement to be corrosion resistant and operable at temperatures up to 500° C., while providing residence times between about 1 second and about 10 seconds. In some embodiments of the present disclosure, the filter elements utilized in a hot-gas filter unit 122 may be constructed of extruded, sintered, and/or foamed materials.

Referring again to FIGS. 2A-2D, a hot-gas catalyst unit 126 may include at least one catalyst 220, e.g. a packed bed of catalyst. In some embodiments of the present disclosure, a catalyst may include a heteropolyacid (HPA) with both redox sites (that create coordinately unsaturated cationic sites or Lewis acid sites) and Brønsted acid sites for example, at least one of a titania-supported molybdenum heteropolyacid (e.g. $H_3PMo_{12}O_{40}/TiO_2$; i.e. Mo-HPA/$TiO_2$), a titania-supported molybdenum-vanadium heteropolyacid (e.g. $H_5PMo_{10}V_2O_{40}/TiO_2$), or a titania-supported tungsten heteropolyacid (e.g. $H_3PW_{12}O_{40}/TiO_2$). Other catalysts 220 that may be used in a CHGF 120 include at least one of a rare earth metal oxide (such as cerium oxide and/or lanthanum oxide), and/or a ring opening catalyst. In some embodiments of the present disclosure, ring opening catalysts may be used to catalyze the upgrading of vapor phase lignin species. Examples of ring opening catalysts include Pd/NiO, Pt and/or Pd on zeolites (A, USY, Beta, HZSM-5, MFI, mordenite), Pt and/or Pd on molecular sieves of all types, bimetallic catalysts such as Ni—Cr/$Al_2O_3$, and/or at least one of Ir, Rh, and/or Pt positioned on a metal oxide support such as alumina. In some embodiments of the present disclosure, a HPA may be combined with a ring opening catalysts to enhance the overall catalyst mixture's activity. However, these catalysts are provided for illustrative purposes, and a catalyst and its characteristics may be tailored to the specific requirements of the components contained in the pyrolysis vapors.

As defined herein, an HPA (Keggin-type described below) is a structure that includes a metal oxide framework surrounding a central heteroatom, for example, at least one of phosphorus, silicon, boron, cobalt, germanium, aluminum, or arsenic. The metal oxide framework may be constructed of twelve octahedrally coordinated metal clusters, for example, at least one of molybdenum, vanadium, tungsten, an/or tantalum bonded together through oxygen atoms with additional oxygen linkages to the central heteroatom. In some embodiments of the present disclosure, HPAs were selected for the reactions described herein because, among other things, of their abilities to catalyze hydrodeoxygenation (HDO) and alkylation reactions. HPAs in general are characterized by various structure types, including Lindquist-, Keggin-, and Wells-Dawson-type structures and are also referred to as polyoxometalates when in their conjugate anion form. These Lindquist-, Keggin-, and Wells-Dawson-type HPAs contain six, twelve, and eighteen framework transition metal atoms (M) with chemical formulas of $[M_6O_{19}]^{2-}$, $[XM_{12}O_{40}]^{n-}$, and $[X_2M_{18}O_{62}]^{n-}$, respectively, with the Keggin- and Wells-Dawson-type HPAs also possessing central heteroatoms (X), where n is an integer. Framework transition metal atoms (addenda atoms), M, may include molybdenum, tungsten, vanadium, and tantalum. Heteroatoms, X, may include phosphorus ($P^{5+}$), silicon ($Si^{4+}$), aluminum ($Al^{3+}$), cobalt ($Co^{2+, 3+}$) germanium ($Ge^{4+}$), arsenic ($As^{3+, 4+}$) and boron ($B^{3+}$).

In some embodiments of the present disclosure, the acidity of an HPA may be tuned for product selectivity (e.g. alkylation, ketonization, hydrodeoxygenation). HPAs may have strong Brønsted character. Lewis acidic sites can be incorporated into the HPA by metal substitution or reducing environments typically achieved by appropriate HPA—support interactions and reaction conditions. The acid strength of HPAs composed of tungsten are more acidic than those composed of molybdenum, and the effect of the central atom is not as great as that of the addenda atoms (M). Phosphorus-based HPAs are slightly more acidic than silicon-based HPAs. As shown herein, due to the modest acidity of molybdenum-based HPAs, both HDO and alkylation reaction pathways were highly favorable relative to the more acidic tungsten-based HPAs. For example, an HGF may be constructed using ceramic filter media containing a catalyst that includes at least one of an HPA and/or a rare earth oxide, which may be tailored to upgrade pine fast pyrolysis vapors for downstream processing.

Thus, in some embodiments of the present disclosure, a catalyst 220 may include at least one rare earth metal oxide (without an HPA) to, among other things, ketonize vapor phase acetic acid to more upgradeable acetone. Examples of rare earth metal oxides include yttrium oxide ($Y_2O_3$), cerium oxide ($CeO_2$), lanthanum oxide ($La_2O_3$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), dysprosium oxide ($Dy_2O_3$), holmium oxide ($Ho_2O_3$), erbium oxide ($Er_2O_3$), ytterbium oxide ($Yb_2O_3$), lutetium oxide ($Lu_2O_3$), scandium oxide ($Sc_2O_3$), and/or thulium oxide ($Tm_2O_3$). The metal oxide chemical formulas are provided for illustrative purposes and other metal oxide compositions fall within the scope of the present disclosure, depending on the oxidations states of the elements making up the metal oxides.

In some embodiments of the present disclosure, the Keggin-type structure of an HPA may be metal-substituted (e.g. molybdenum-vanadium heteropolyacid (Mo—V-HPA/$TiO_2$) and/or heteroatom-substituted (e.g. silicon-substituted) analogs. Additional catalysts for use in the present disclosure include, but are not limited to, zeolites (e.g. HZSM-5, Y-zeolite, β-zeolite, SBA-15, and/or MCM-41), metal oxides and their mixtures (e.g. ZnO, CaO, CuO, MgO, NiO, $TiO_2$, $ZrO_2$, $MnO_2$, $MoO_3$, $Al_2O_3$, and/or $Fe_2O_3$), rare earth oxides (e.g. $CeO_2$, $La_2O_3$, $Nd_2O_3$, and/or $Pr_6O_{11}$), metal carbides, metal nitrides, and/or metal phosphides (e.g. $Mo_2C$, $W_2C$, $Mo_2N$, $W_2N$, and/or NiP). Combinations of these formulations in the form of supported metals (e.g. transition metals, noble metals, alkali and alkaline earth metals), HPAs, metal oxides and their mixtures, metal carbides, metal nitrides, and/or metal phosphides may also be used as bifunctional catalyst materials.

In some embodiments of the present disclosure, an HPA may be positioned on a support. Supports may include, but are not limited to, zeolites, $SiO_2$, $TiO_2$, $ZrO_2$, $CeO_2$, and/or $Al_2O_2$, and the abovementioned metal carbides, metal nitrides, metal phosphides, zeolites, mordenites, and/or molecular sieves. Due to the unique redox properties of HPAs, in some embodiments of the present disclosure, a reducible support material may be used to support a catalyst, for example titanium dioxide (anatase), cerium oxide, and/or a cerium/zirconium oxide mixture (i.e. $CexZr_{1-x})_2$ to stabilize and tune the activity of the catalyst, where x is between zero and one, inclusively. In some embodiments of the present disclosure, a hot-gas filter unit a filter medium possessing a porosity between about 40% and about 50% porosity with a filtration grade of <0.3 µm, while being able to withstand temperatures up to 800° C. for filter regeneration purposes. In some embodiments of the present disclosure, a catalyst utilized in a hot-gas catalyst unit may possess an acid site density (combination of Brønsted and Lewis acid sites) ranging between about 460 mol/g and about 500 mol/g. In some embodiments of the present disclosure, a catalyst utilized in a hot-gas catalyst unit may possess a BET surface area ranging between about 80 $m^2$/g and about 100 $m^2$/g.

As shown herein, a titania-supported $H_3PMo_{12}O_{40}$ heteropolyacid (Mo-HPA/$TiO_2$; Keggin-type) catalyst may be used in a CHGF to upgrade the pyrolysis vapors. As described in more detail below, pine pyrolysis vapors were generated in a small pilot-scale pyrolyzer and transferred to a CHGF via a continuous-flow slipstream. In the CHGF, the untreated pyrolysis vapors generated by the pyrolyzer were filtered and subsequently upgraded using a packed bed of Mo-HPA/$TiO_2$. Real-time monitoring and identification of the products formed (i.e. upgraded pyrolysis vapor) was achieved by molecular beam mass spectrometry (MBMS). It was demonstrated during testing that under a hydrogen-rich environment, the pine vapors were partially deoxygenated and alkylated over the Mo-HPA/$TiO_2$ catalyst. An increase in hydrogen concentration and a reduction in weight-hourly space velocity was observed that likely enhanced deoxygenation and alkylation. Time-on-stream (TOS) studies showed stable product formation up to one hour with little change in catalyst activity. In these experiments, the liquid product was collected using a fractional condensation train (FCT) and analyzed by gas chromatography mass spectrometry to confirm that the upgraded pyrolysis vapor contained species that were at least partially deoxygenated and alkylated. This combination of CHGF and FCT allowed for chemical and physical removal of both foulant and value-added compounds (e.g. phenols, alkylphenols, methoxyphenols, cyclopentenones) for additional enhancement of downstream upgrading processes. The catalyst used in the CHGF were evaluated both pre- and post-reaction using temperature programmed desorption, $N_2$ physisorption, and elemental analysis with results indicating some catalyst coking. As shown herein, a hydrogen-based catalyst regeneration procedure restored the reacted catalyst activity to that of fresh Mo-HPA/$TiO_2$. The hydrogen-based regeneration procedure (in situ regeneration) entailed flowing 100 vol % $H_2$ at a flowrate of 300 SCCM over the catalyst at 400° C. for about 5 hours.

Figure 3:
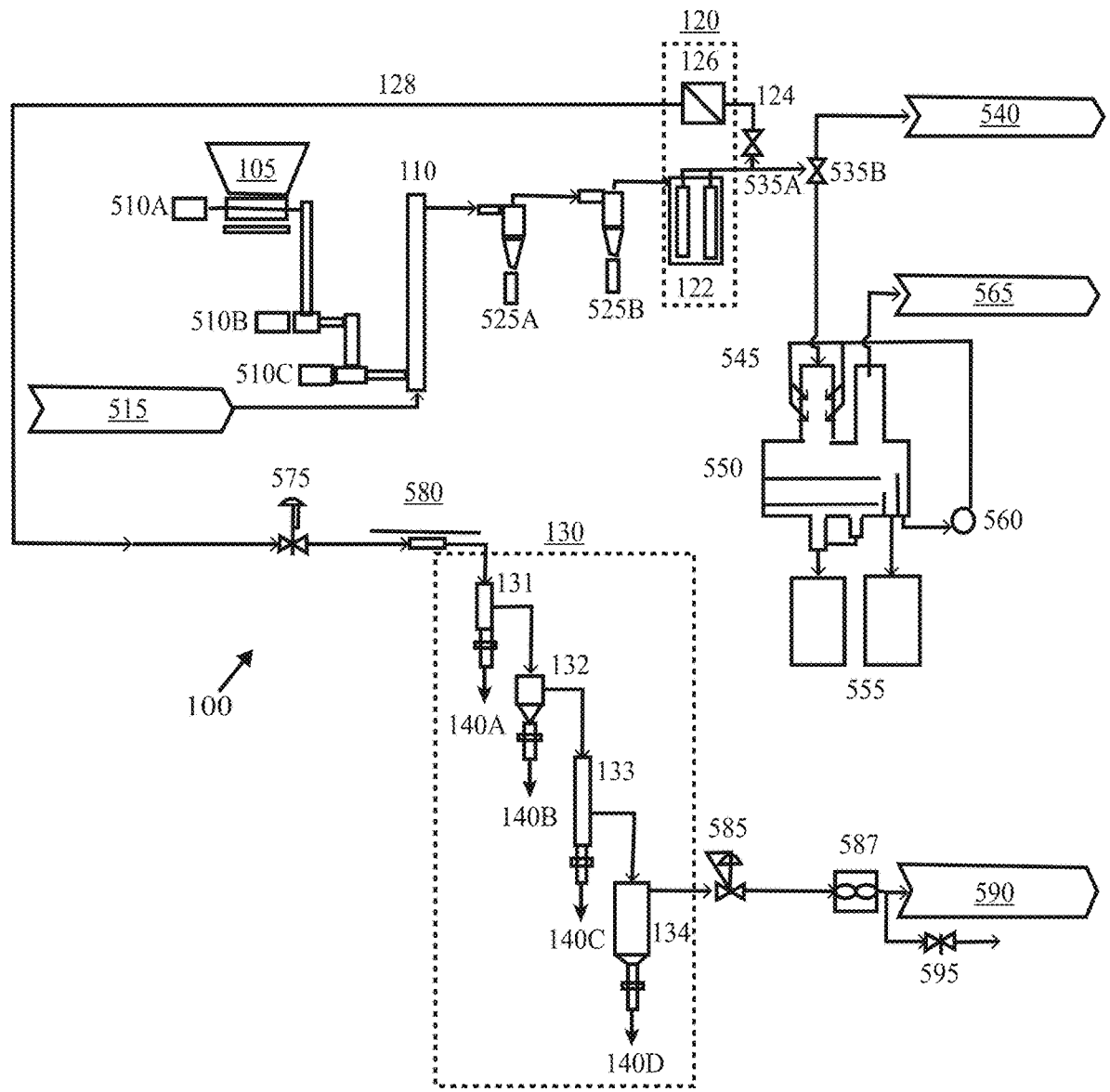
FIG. 3 illustrates a system that includes, among other things, a pyrolyzer, a catalytic hot-gas filter, and a fractional condensation train (FCT), according to some embodiments of the present disclosure.

FIG. 3 depicts a custom pilot-scale system 100 that includes a fluidized bed pyrolyzer 110, according to some embodiments of the present disclosure. The system 100 includes a biomass feed input (i.e. feed stream) 105, feed drive motors 510A, 510B, and 510C, nitrogen carrier gas 515, a fluidized bed pyrolyzer 110, char cyclones 525A and 525B, a CHGF 120, valves 135A and 135B, a product stream 540 (e.g. to a down-stream Davison Circulating Riser (not shown), scrubber nozzles 545, a scrubber system 550, total or combined (e.g. non-fractionated) liquid pyrolysis product 555, a quench fluid pump 560, an exhaust to a local exhaust ventilation 565, a CHGF control valve 575, an MBMS slipstream 580, an FCT 130 (including a passive-cool condenser 131, an electrostatic precipitator 132, an aqueous condenser 133, and a coalescing filter 134), a backpressure regulator 585, a volumetric flow meter 587, an exhaust to a local exhaust ventilation 590, and a gas bag sampling 595. Referring to FIG. 3, it is clear that the CHGF 12 utilized in the pilot scale system 100 is a design like that illustrated in FIG. 2B, where the hot-gas filter unit 122 and the hot-gas catalyst unit 126 are connected in series, but as separate unit operations connected by intervening conduit (e.g. pipe or tubing).

Figure 4:
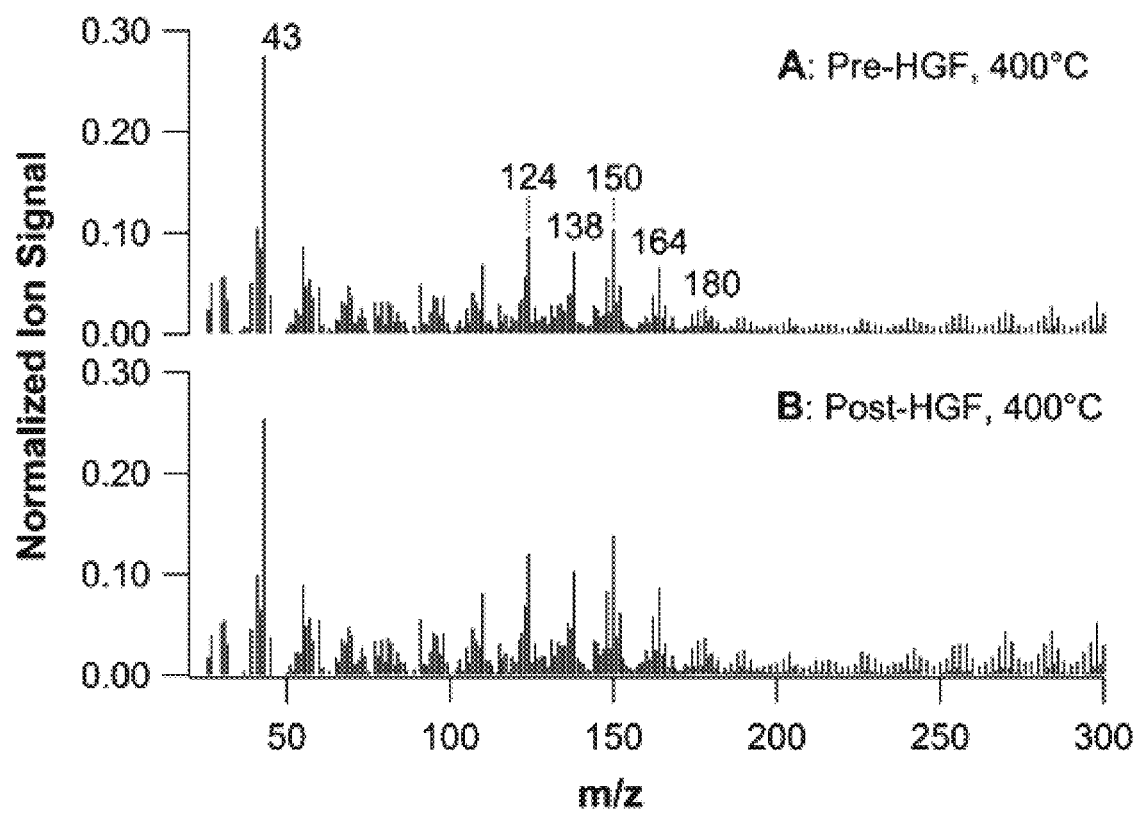
FIG. 4 illustrates mass spectra for pine pyrolysis vapors (A) pre-hot-gas filter and (B) post-hot-gas filter with a weight-hourly space velocity of 1.0 $h^{-1}$ and 40 vol % $H_2$, according to some embodiments of the present disclosure.

The system 100 shown in FIG. 3 was utilized in testing and was employed to pyrolyze biomass at a rate of 1.2 kg/h at 500° C. in a nitrogen ($N_2$) carrier gas 515 fed at a rate of 1.8 kg/h with approximately 0.4 kg of additional $N_2$ purges and operated at 220 kPa (20 PSIG) backpressure (backpressure regulator at the scrubber outlet not shown in FIG. 3). The pyrolyzer 110 was constructed of a 5.3 cm internal diameter fluidized bed reactor employing an olivine bed material as a heat transfer media. The system used a series of two cyclones (525a and 525b) downstream of the pyrolyzer 110 followed by the hot-gas filter unit 122 of a CHGF 120. Subsequently, the resultant filtered pyrolysis vapors 124 could be quenched and condensed in a scrubber system 550 and/or sent down-stream for additional upgrading as stream 540, for example, to a Davison Circulating Riser (DCR) system for vapor-phase upgrading via catalytic fast pyrolysis. As shown in FIG. 3, a slipstream of the filtered pyrolysis vapor 124 was directed to the second part of the CHGF 120, the hot-gas catalyst unit 126. As shown in FIG. 4, a molecular beam mass-spectrometry analysis of the pre- and post-hot-gas filter unit 122, the hot-gas filter unit 122 did not significantly affect the pyrolysis vapor composition. In addition, complete removal of char and ash using the pilot-scale hot-gas filter unit 122 of the CHGF 120 was demonstrated, with the results described in detail below. As described above, the removal of these particulate components may protect the down-stream hot-gas catalyst unit 126 and/or other down-stream unit operations. The m/z values 124, 138, 150, 164, and 180 correspond to primary vapor products: guaiacol, methyl-guaiacol, 4-vinyl-guaiacol, isoeugenol, and coniferyl alcohol. (*m/z=43 is a carbohydrate fragment.)

In fact, the hot-gas catalyst unit 126 also included a filter element positioned before the catalyst, in a single housing. Both the hot-gas filter unit 122 and the hot-gas catalyst unit 126 utilized ceramic DiaSchumalith® filter elements (filtration grade, 0.3 µm) comprised of a silicon carbide inner core with a mullite (aluminosilicate mineral) outer layer. In the case of the hot-gas catalyst unit 126, the filter elements were utilized as a support structure for the catalyst. Thus, the CHGF 120 employed in the pilot-scale system 100 utilized a hot-gas filter unit 122 connected in series to a hot-gas catalyst unit 126 where the catalyst was positioned on a filter element.

The cyclones 525 (525A and 525B), the CHGF 120, and transfer lines were heated to 450° C., 430° C., and 400-450° C., respectively. As described above, the catalyst used in the hot-gas catalyst unit 126 was positioned within the core of the filter elements. This strategy of packing the catalyst of the hot-gas catalyst unit in its own separate housing, enabled the decoupling of the filtration step from partial deoxygenation and chemical conditioning reaction steps, allowing for char and alkali removal prior to the partial catalytic upgrading. Additionally, the upgraded pyrolysis vapor 128 exiting the hot-gas catalyst unit 126 was coupled to an MBMS for real-time analysis of products. Also, as shown in FIG. 3, the upgraded pyrolysis vapor 128 was subsequently directed to a FCT 130 for controlled condensation of liquid products.

As described above, the FCT 130 and shown in detail in FIG. 5, included a passive-cool condenser 131, a temperature-controlled electrostatic precipitator 132 with condenser, an aqueous condenser 133, and a coalescing filter 134; all with associated product knockouts to produce pyrolysis oil 140 fractions. The ESP 132 condenser was operated between 70-170° C., the aqueous condenser 133 at −15° C., and the coalescing filter 134 at ambient temperature. The mass flowrate through the CHGF system was controlled using an air-to-close proportioning control valve (CHGF flow control valve). The MBMS 580 and FCT 130 were operated at 117 kPa (5 PSIG) with the CHGF 120 operating at 220 kPa (~20 PSIG); ~6.9-13.8 kPa (~1-2 PSI) differential across the entire CHGF unit operation and with the pyrolyzer 110 marginally above 220 kPa (20 PSIG). The volumetric flowrate of the vapor-stripped effluent from the coupled MBMS-FCT system was measured by a dry test meter, shown as a volumetric flow meter 587 of FIG. 3. Residual non-condensable gases were captured for off-line analysis via a gas bag sampling system 595 on the MBMS-FCT system effluent. Pressure gauge 915, thermocouples 940 (a-c) and associated data acquisition system 955, product sight-glasses 925 (a-d), product sampling valves 930 (a-d), FCT effluent filter 975, effluent oxygen limit switch 980/985, and electrostatic precipitator power and control unit 995 in FIG. 3 represent auxiliary components required for proper FCT operation.

Figure 6:
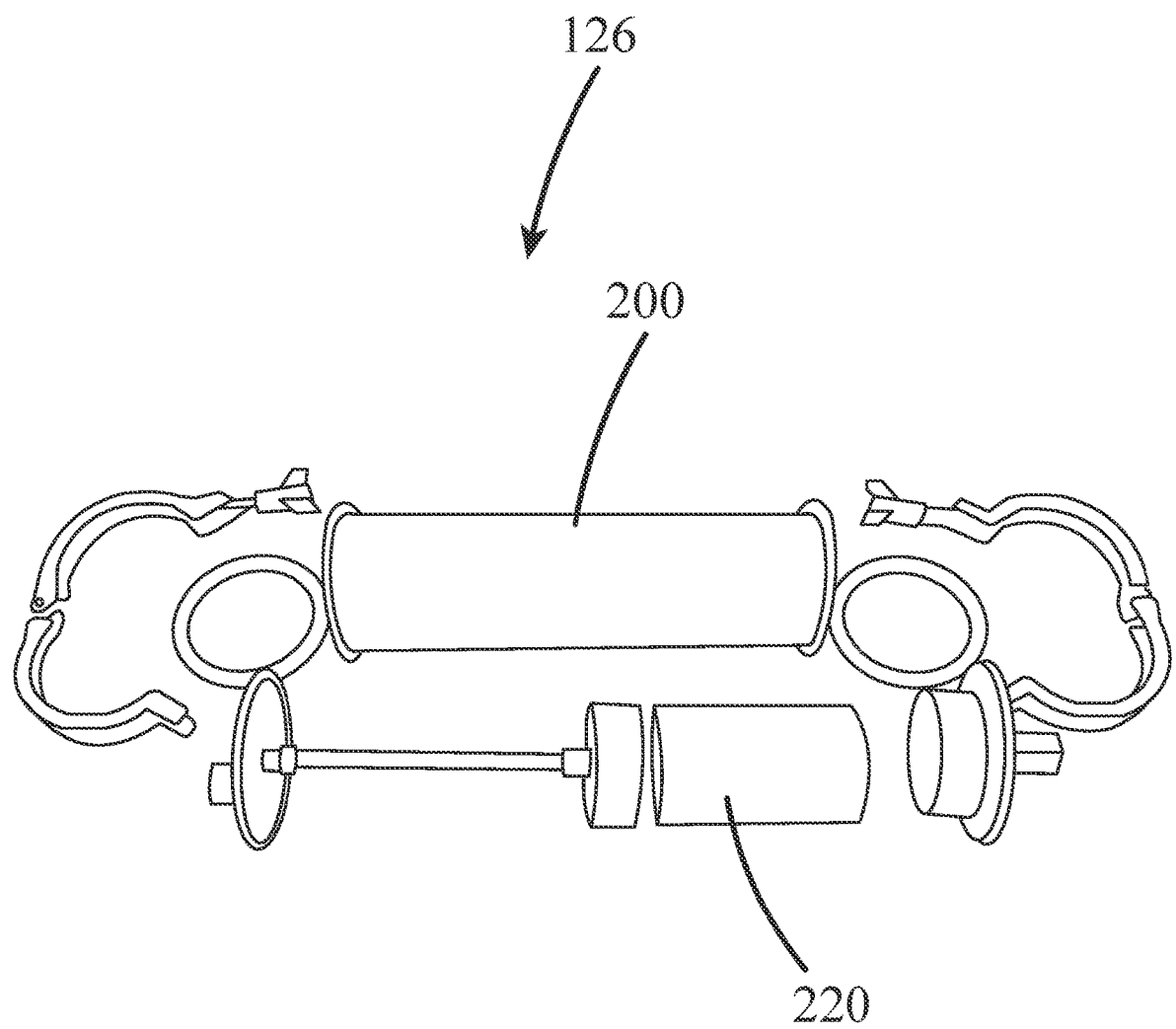
FIG. 6 illustrates a hot-gas catalyst unit, according to some embodiments of the present disclosure.

As described above, the hot-gas catalyst unit 126 of the CHGF 120 tested herein was constructed of a housing equipped with a mount for securing 102 mm lengths of 60 mm diameter ceramic DiaSchumalith® filter elements, which acted as support for the catalysts implemented in the hot-gas catalyst unit 126. These support structures were mounted in the hot-gas catalyst unit's housing, which was configured to receive the slip-stream from the hot-gas filter unit 122. The flow path was directed from the outside of the support structure and inward radially through the packed catalyst bed constructed of catalyst loaded onto the support structure. The hot-gas catalyst unit 126 utilized in the pilot-scale system 100 is illustrated in FIG. 6.

All CHGF experiments were conducted at about 400° C. with a time-on-stream (TOS) of 60 minutes using 40 g of Mo-HPA/$TiO_2$ catalyst, positioned as described above, in the hot-gas catalyst unit 126. A series of control experiments were conducted prior to upgrading experiments: (1) empty housing, (2) housing with ceramic filter support, and (3) housing with ceramic filter support packed with $TiO_2$, all in 40 vol % $H_2$. Then, for testing catalytic upgrading of the filtered pyrolysis vapor, the housing of the hot-gas catalyst unit was loaded with support filter elements packed with catalyst, for example Mo-HPA/$TiO_2$ catalyst. The Mo-HPA/$TiO_2$ catalyst material described above was investigated in the continuous-flow catalyst test experiments as W-HPA/$TiO_2$ proved to be ineffective based on the pulsed-flow lab scale results (discussed below). Both WHSV and $H_2$ concentration sweep experiments were conducted with the Mo-HPA/$TiO_2$ catalyst to investigate the impact of each parameter on activity. Initial testing of the Mo-HPA/$TiO_2$ at a pyrolysis vapor WHSV of ~2 $h^{-1}$ with 40 vol % $H_2$ showed diminished activity compared to the lab scale results obtained at the same WHSV and 50 vol % $H_2$. Consequently, pyrolysis vapor WHSV was about 1-0.25 $h^{-1}$ while the $H_2$ concentration was maintained at a range between 40 vol % and 80 vol %. These ranges (i.e. sweep experiments) were conducted both independently and simultaneously to determine their individual and combined effects.

Subsequent to the sweep experiments, a triplicate set of Mo-HPA/TiO$_2$ experiments was conducted to assess reproducibility and mass balance closure. Replicate experiments were conducted using WHSV of 1 h$^{-1}$, 40 vol % H$_2$ at 400° C., and 60 min TOS. In addition, Mo-HPA/TiO$_2$ regeneration experiments were conducted using H$_2$. This protocol (in situ regeneration) entailed flowing 100 vol % H$_2$ at a flowrate of 300 SCCM over the catalyst at 400° C. for 5 hours. The regeneration time was based on the complete removal of the hydrogen-induced desorbed species as monitored via MBMS. Post-regeneration, the catalyst was re-evaluated using the same conditions as those used in the replicate experiments above.

Figure 7:
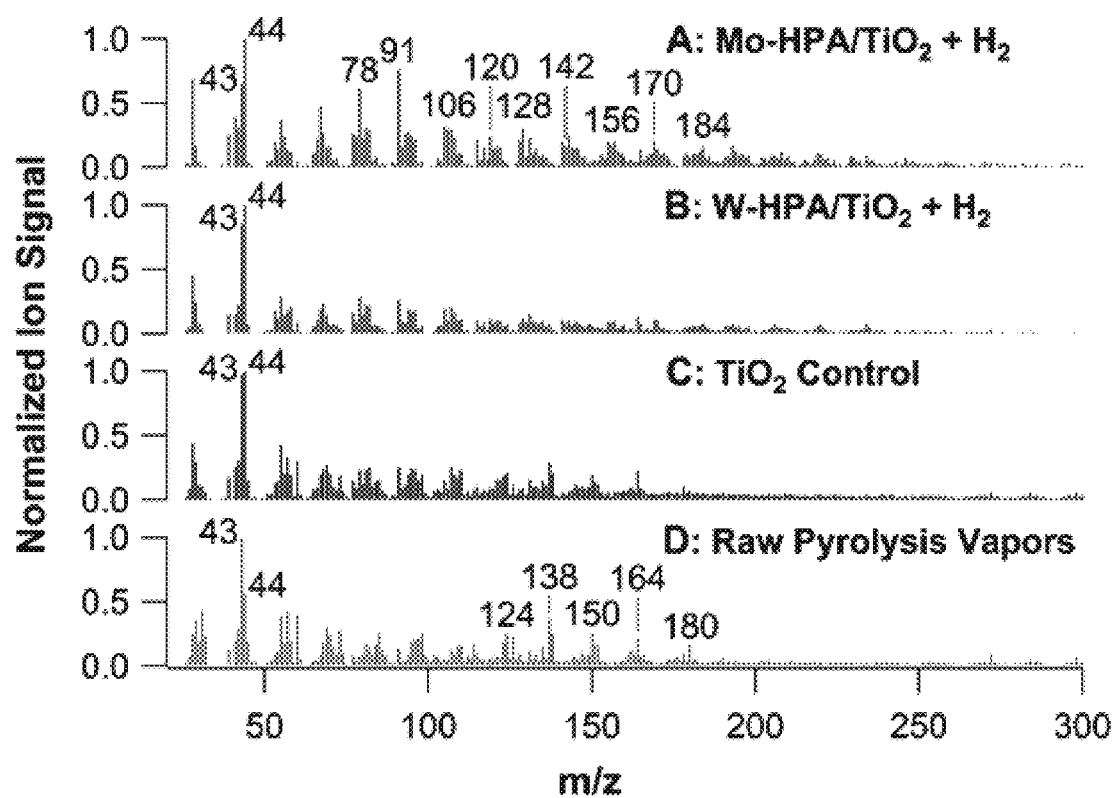
FIG. 7 illustrates mass spectra for (A) partial upgrading of pine pyrolysis vapors using molybdenum heteropolyacid on titania as a catalyst, (B) partial upgrading of pine pyrolysis vapors using tungsten heteropolyacid on titania as a catalyst, (C) pine pyrolysis vapors using titanium oxide (i.e. titania), and (D) pure pine pyrolysis vapors (control), according to some embodiments of the present disclosure.

Initial lab scale screening of Mo-HPA/TiO$_2$ and W-HPA/TiO$_2$ catalyst materials without hydrogen using a WHSV of pyrolysis vapors of 2 h$^{-1}$ showed limited activity towards pyrolysis vapor deoxygenation or alkylation with rapid deactivation. Both materials produced large amounts of carbon dioxide (m/z=44) at the expense of primary pyrolysis vapors without any clear changes in oxygenate composition, suggesting thermal and/or catalytic cracking as the primary mechanism for carbon loss. Upon the addition of 50 vol % hydrogen, Mo-HPA/TiO$_2$ showed a marked increase in activity and stability, while the W-HPA/TiO$_2$ catalyst showed little improvement. Comparison of catalytic activity between the Mo-HPA/TiO$_2$ and W-HPA/TiO$_2$ materials is shown in FIG. 7. Due to the inactivity of the W-HPA/TiO$_2$ material, continued screening experiments focused on Mo-HPA/TiO$_2$. The Mo-HPA/TiO$_2$ catalyst exhibited both HDO activity, as evidenced by benzene, toluene, and xylene (BTX) production, and alkylation activity based on the appearance of polyalkyl benzenes, naphthalene, anthracene, and their respective alkylated derivatives (methyl and dimethyl). In addition, higher order alkylated hydrocarbons (m/z>200) were observed (data not shown). Both HDO and alkylation activity were proportional to the hydrogen concentration. Here, similar HDO and alkylation reactions were promoted when using a polyoxometalate catalyst (conjugate anion of a heteropolyacid) with anisole and 4-propylguaiacol model compounds in a hydrogen environment. Stability experiments for Mo-HPA/TiO$_2$ (50 vol % H$_2$) over a cumulative catalyst-to-biomass ratio of 1.5 indicated that little to no deactivation occurred. In fact, the deoxygenated and alkylated products appeared to increase with TOS.

FIG. 7 illustrates mass spectra for pulsed-flow lab scale experiments for (A) partial upgrading of pine pyrolysis vapors with 15 wt % molybdenum heteropolyacid on titania (15 wt % Mo-HPA/TiO$_2$) using a WHSV of 2.0 h$^{-1}$ and 50 vol % H$_2$, (B) partial upgrading of pine pyrolysis vapors using 15 wt % tungsten heteropolyacid on titania (15 wt % W-HPA/TiO$_2$), WHSV of 2.0 h$^{-1}$ $^{and}$ 50 vol % H$_2$, (C) pine pyrolysis vapors using TiO$_2$, WHSV of 2.0 h$^{-1}$ without H$_2$, and (D) pure pine pyrolysis vapors (control) at a flowrate equivalent to WHSV of 2.0 h$^{-1}$ without H$_2$. All experiments conducted at 400° C. The m/z values 78, 91, 106, 120, 128, 142, 156, 170, and 184 correspond to benzene, toluene, xylenes, trimethylbenzenes, naphthalene, mono-, di-, tri-, and tetra-methyl-naphthalenes, respectively. The m/z values 124, 138, 150, 164, and 180 correspond to primary vapor products: guaiacol, methyl-guaiacol, 4-vinyl-guaiacol, isoeugenol, and coniferyl alcohol. Various alkylated isomers are not distinguishable based on MBMS spectra and were denoted as the methylated derivatives. (*m/z=43 is a carbohydrate fragment and m/z=44 is carbon dioxide.)

Figure 8:
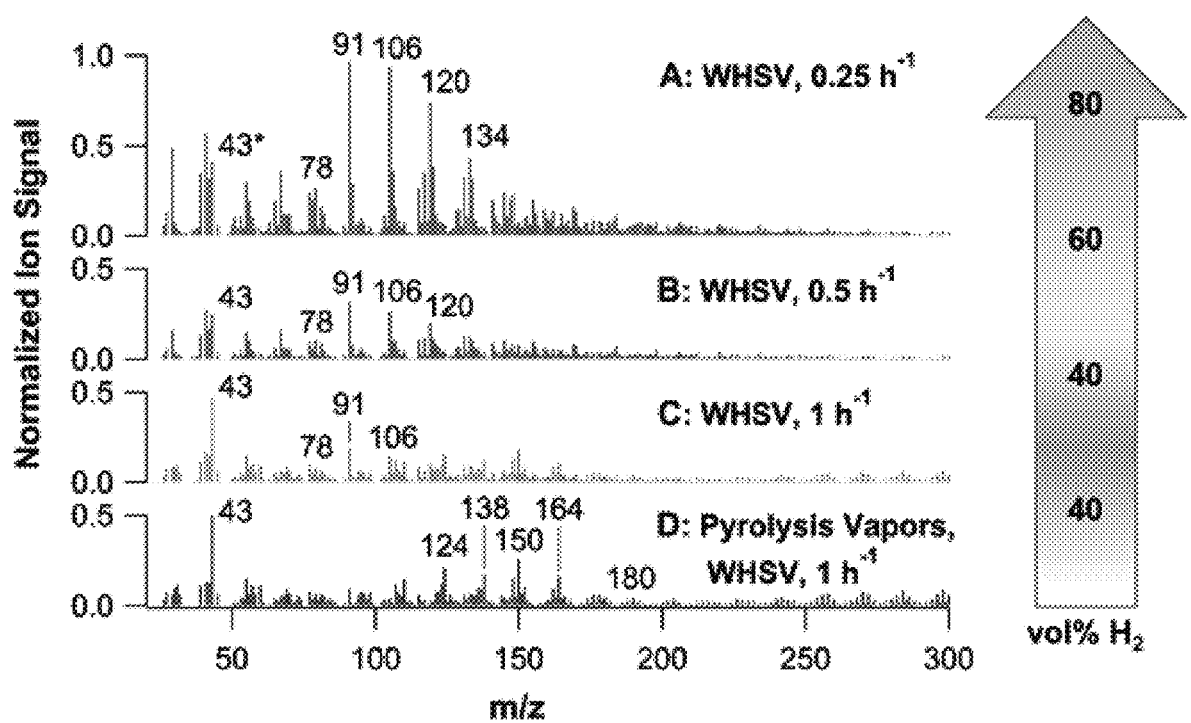
FIG. 8 illustrates mass spectra that demonstrate, among other things, the simultaneous reduction in vapor weight-hourly space velocity and an increase in hydrogen gas concentration (vol %) for upgrading of pyrolysis vapors using molybdenum heteropolyacid on titania as a catalyst and three different concentrations of hydrogen gas, and a control without a catalyst on titania and only hydrogen gas and pyrolysis vapors, according to some embodiments of the present disclosure.

Continuous-flow pyrolysis vapor experiments using Mo-HPA/TiO$_2$ with the CHGF system employing the same operating conditions as used in the pulsed-flow studies (i.e. 400° C., WHSV of ~2 h$^{-1}$, 40 vol % H$_2$) showed lower activity. Since hydrogen was constantly flowing during the biomass pulses, catalyst deactivation in pulsed-flow experiments may have been mitigated. Additionally, the difference in flow dynamics between the pulsed- and continuous-flow experiments (i.e. axial versus radial flow path, respectively) may have contributed to the diminished activity. As shown in FIG. 8, a marked improvement in HDO and alkylation activity emerged after decreasing the WHSV to 1 h$^{-1}$. A progressively higher activity was observed after lowering the WHSV to 0.25 h$^{-1}$. Activity was also enhanced by increasing the H$_2$ concentration at a constant WHSV of 1 h$^{-1}$. Simultaneously decreasing the WHSV of the pyrolysis vapors over the catalyst and increasing the hydrogen concentration resulted in a cumulative effect where activity was further enhanced compared to the independent changes in the two parameters. These results are summarized in a series of MBMS spectra shown in FIG. 8; (A) partial upgrading of pine pyrolysis vapors with 15 wt % Mo-HPA/TiO$_2$ (represented as 15 wt % of the total weight of the titania support plus supported HPA), WHSV of 0.25 h$^{-1}$ and 80 vol % H$_2$, (B) partial upgrading of pine pyrolysis vapors using 15 wt % Mo-HPA/TiO$_2$, WHSV of 0.5 h$^{-1}$ and 60 vol % H$_2$, (C) partial upgrading of pine pyrolysis vapors using 15 wt % Mo-HPA/TiO$_2$, WHSV of 1.0 h$^{-1}$ and 40 vol % H$_2$, and (D) pure pine pyrolysis vapors (control) at a flowrate equivalent to WHSV of 1.0 h$^{-1}$ and 40 vol % H$_2$. In decreasing WHSV and increasing H$_2$, enhanced HDO and alkylation activity were observed with the progressive appearance of benzene (m/z 78), toluene (m/z 91), xylene (m/z 106), and further methylated benzene derivatives (m/z 120 and 134) at the expense of lignin-derived pine pyrolysis compounds (primary vapor products: m/z 124, 138, 150, 164, and 180) produced in the pure pine pyrolysis vapors control (D). Carbon dioxide signals (m/z=44) were similar across spectra and were omitted to reduce the ordinate scale. These products demonstrate how methylated benzene derivatives up to pentamethyl benzene and alkylated phenolics were observed for anisole conversion over a titania-supported molybdenum HPA at 320° C.

FIG. 8 illustrates mass spectra for simultaneous reduction in weight-hourly space velocity (WHSV) and increase in H$_2$ concentration for (A) partial upgrading of pine pyrolysis vapors with 15 wt % molybdenum heteropolyacid on titania (15 wt % Mo-HPA/TiO$_2$) using a WHSV of 0.25 h$^{-1}$ and 80 vol % H$_2$, (B) partial upgrading of pine pyrolysis vapors using 15 wt % Mo-HPA/TiO$_2$, WHSV of 0.5 h$^{-1}$ and 60 vol % H$_2$, (C) partial upgrading of pine pyrolysis vapors using 15 wt % Mo-HPA/TiO$_2$, WHSV of 1.0 h$^{-1}$ and 40 vol % H$_2$, and (D) pure pine pyrolysis vapors (control) at a flowrate equivalent to WHSV of 1.0 h$^{-1}$ and 40 vol % H$_2$. Carbon dioxide signals (m/z=44) were similar across spectra and were omitted to reduce the ordinate scale. All experiments conducted at 400° C. The m/z values 78, 91, 106, 120, and 134 correspond to benzene, toluene, xylenes, tri-, and tetramethylbenzenes, respectively. The m/z values 124, 138, 150, 164, and 180 correspond to primary vapor products guaiacol, methyl-guaiacol, 4-vinyl-guaiacol, isoeugenol, and coniferyl alcohol, respectively. (*m/z=43 is a carbohydrate fragment.)

The replicate experiments conducted at less severe conditions (WHSV of 1 h$^{-1}$, 40 vol % H$_2$ at 400° C., and 60 min TOS) demonstrated production of BTX with minor alkylation activity, in accord with the goal of achieving partial deoxygenation prior to additional downstream upgrading. Reasonable agreement in activity between replicate experiments was achieved with results shown as difference plots in Panel A of FIG. 9. The difference plots were generated from argon-normalized MBMS composite signals. The composite signals were grouped into five categories: sugar- and lignin-derived pine primary pyrolysis vapors, BTX, polyalkyl benzenes, naphthalenes, and anthracenes. The summed sugar- and lignin-derived pine primary pyrolysis vapor species include acetic acid, furan, furfuryl alcohol, guaiacol, 5-hydroxymethyl-furfural or levoglucosenone, methyl-guaiacol, 1,4:3,6-dianhydro-α-D-glucopyranose, 4-vinyl-guaiacol, isoeugenol, and coniferyl alcohol with corresponding m/z values of 60, 68, 98, 124, 126, 138, 144, 150, 164, and 180, respectively. Summed BTX includes benzene, toluene, and xylenes with m/z values of 78, 91, and 106, respectively. The composite naphthalenes and anthracenes signals, including their associated methyl- and dimethyl-derivatives, have corresponding m/z values of 128, 142, 156, 178, 192, and 206, respectively. The degree of HDO activity was assessed based on BTX while alkylation activity can be correlated to the production of toluene, xylenes, polyalkyl benzenes, naphthalenes, and anthracenes.

Figure 9:
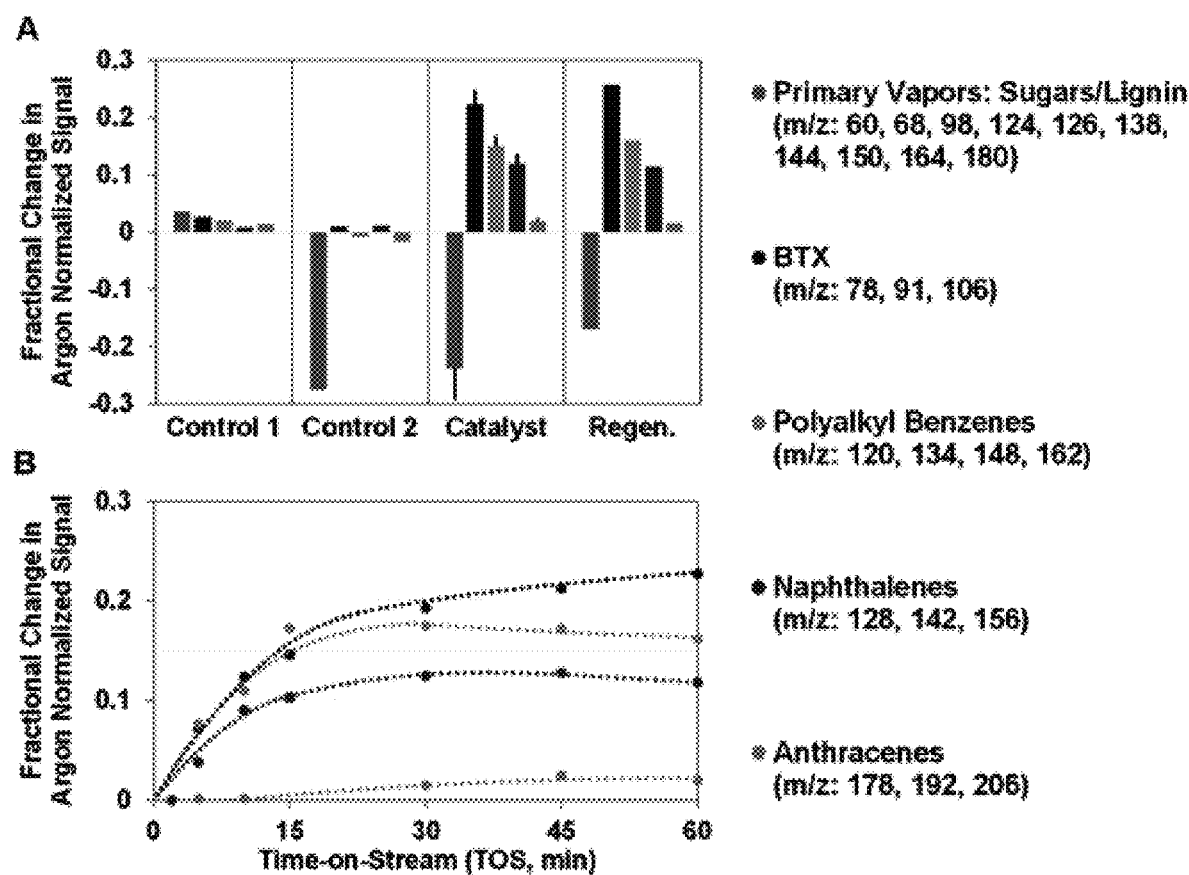
FIG. 9 illustrates mass spectra difference data plots for the partial upgrading of pine pyrolysis vapors using molybdenum heteropolyacid on titania, according to some embodiments of the present disclosure.

FIG. 9 illustrates mass spectra difference data plots for partial upgrading of pine pyrolysis vapors using molybdenum heteropolyacid on titania (15 wt % Mo-HPA/$TiO_2$) and associated controls. Panel A of FIG. 9 shows difference plots demonstrating conversion of primary pyrolysis vapors (sugar- and lignin-derived) to benzene, toluene, and xylene (BTX), polyalkyl benzenes, naphthalenes, and anthracenes upon catalyst addition. Control 1 represents filter housing data subtracted from empty filter data (i.e. Filter-Filter Housing), Control 2 represents empty filter data subtracted from filter with $TiO_2$ data (i.e. Filter/$TiO_2$-Filter), Catalyst represents empty filter data subtracted from filter with Mo-HPA/$TiO_2$ data (i.e. Mo-HPA/$TiO_2$-Filter), and Regen. represents Mo-HPA/$TiO_2$-Filter data for $H_2$-regenerated catalyst. Catalyst experiments were conducted in triplicate with standard deviation bars shown. Panel B of FIG. 9 shows time-on-stream (TOS) plot using difference data (Mo-HPA/$TiO_2$-Filter) showing trends in BTX, polyalkyl benzenes, naphthalenes, and anthracenes as a function of TOS. Primary pyrolysis vapor difference data was negative and so not shown in TOS plot. All experiments implemented a weight-hourly space velocity (WHSV) of 1.0 h$^{-1}$ and 40 vol % $H_2$ at 400° C.

In Panel A of FIG. 9, Control 1 represents filter housing MBMS spectral data subtracted from empty filter data (i.e. Filter-Filter Housing), Control 2 represents empty filter data subtracted from filter with $TiO_2$ data (i.e. Filter/$TiO_2$-Filter), Catalyst represents empty filter data subtracted from filter with Mo-HPA/$TiO_2$ data (i.e. Mo-HPA/$TiO_2$-Filter), and Regen. represents Mo-HPA/$TiO_2$-Filter data for $H_2$-regenerated catalyst. Minimal difference is seen between the filter and the filter housing data (Control 1). The minor increase in primary vapors and products may be attributable to thermal cracking in the filter housing experiments since, without a filter present, the housing possesses a greater volume and thus the vapor residence time within the housing is greater. This is substantiated in that bio-oil yield loss was shown via mass balance to be minimal between filter and filter housing experiments (discussed below). A large difference in primary vapors is exhibited between the filter with $TiO_2$ and the filter data (Control 2) indicating that the $TiO_2$ support chemically interacts with oxygenates in the pyrolysis vapors. This is thought to be due to the reducible nature of the $TiO_2$ support. Oxygen deficient titania ($TiO_2$-x) can be obtained by the thermal treatment of anatase $TiO_2$ under flowing $H_2$. The difference between filter with $TiO_2$, with $H_2$, and filter with $TiO_2$ controls (data not shown) indicated minimal changes in vapor composition except for a significant increase in water production (52%). This increase in water suggests that the $TiO_2$ support was partially reduced under hydrogen. Because of the reducible nature of the $TiO_2$ support and the redox properties of the Mo-HPA, it is likely that the activity enhancement of the Mo-HPA is occurring due to charge-transfer dynamics between the $TiO_2$ support and HPA. The agreement between the triplicate Mo-HPA/$TiO_2$ experiments in terms of HDO and alkylation activity is evident in that primary pyrolysis vapors were reduced by 23.3±6.2%, BTX increased by 23.2±1.8%, polyalkyl benzenes increased by 15.2±1.9%, naphthalenes increased by 12.6±1.0%, and anthracenes increased by 2.1±0.5%. Intriguingly, acetic acid was reduced by 1.8±0.6%. This was an encouraging result, as acetic acid is known to promote instability in condensed bio-oil products and is a target of the CHGF process for vapor preconditioning prior to downstream upgrading. In addition, $H_2$ regeneration of the catalyst was effective since results were within statistical variation (Gaussian) of the replicates (see Panel A of FIG. 9).

Panel B of FIG. 9 shows a plot using MBMS difference data (Mo-HPA/$TiO_2$-Filter) showing trends in BTX, polyalkyl benzenes, naphthalenes, and anthracenes as a function of TOS. Primary pyrolysis vapor difference data was negative (i.e. reduction in primary pyrolysis vapors) and are not shown on the TOS plot. It is significant to note that this catalyst system was stable under $H_2$ with no significant indication of deactivation after 1 hour of continuous-flow TOS, as evidenced by a continuous increase in the trends for BTX and anthracenes with TOS. Polyalkyl benzenes and naphthalenes also increase to a stable level before decreasing marginally at the end of 60 minutes TOS. This suggests that hydrogen may not only promote HDO and alkylation activity but also balance coke and product formation, thereby stabilizing activity by hindering coke-induced deactivation. As discussed below, it is proposed that hydrogen activation and subsequent reaction with surface-adsorbed intermediates hinders conversion of those intermediates to coke and promotes product formation. Similarly, concomitant generation of water (steam) and subsequent reaction with surface-adsorbed species may further reduce coking.

Figure 10:
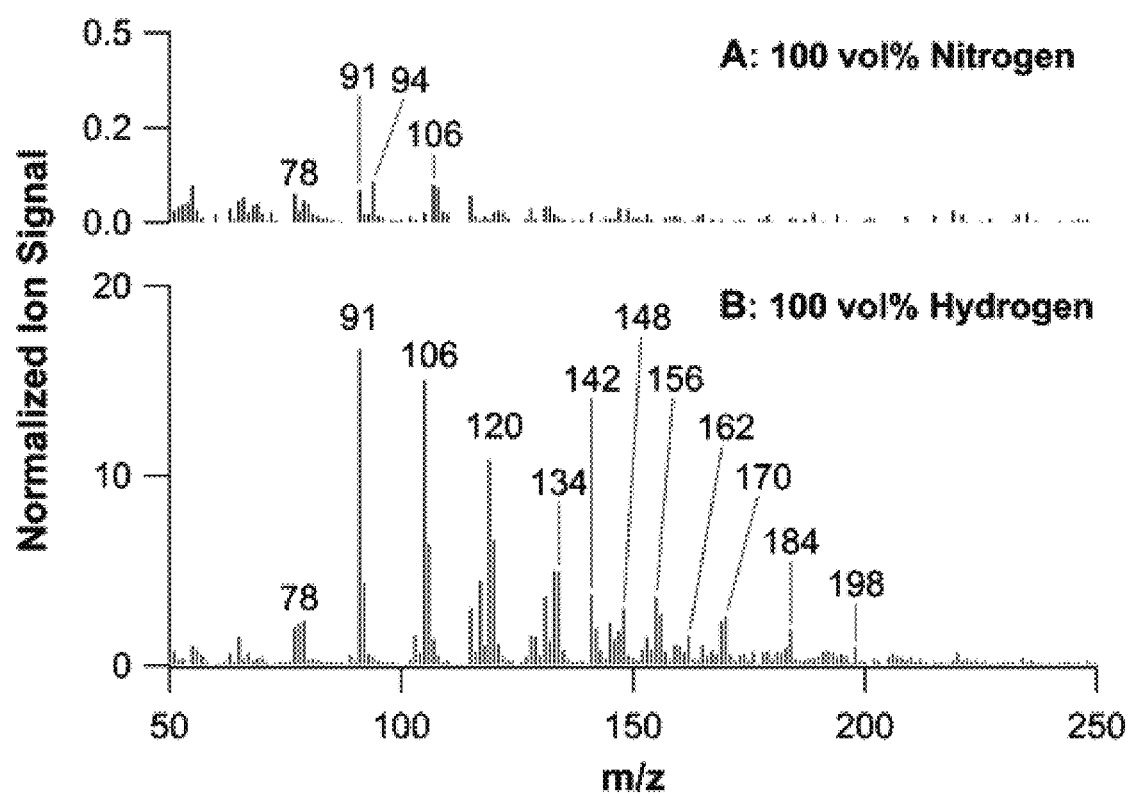
FIG. 10 illustrates mass spectra for desorbed products evolved from molybdenum heteropolyacid on titania post-reaction under (A) nitrogen regeneration protocol conditions, and (B) hydrogen gas regeneration protocol conditions, according to some embodiments of the present disclosure.

This is further substantiated in FIG. 10. Panels A and B of FIG. 10 present MBMS spectra for desorbed products evolved from the post-reaction Mo-HPA/$TiO_2$ catalyst before $H_2$-regeneration and during $H_2$-regeneration, respectively, using the same temperature and flowrate conditions. Minimal product evolution was seen under nitrogen while significant amounts of BTX, naphthalenes, anthracenes, and their alkylated derivatives were produced under hydrogen. Because these are the same compounds produced during the CHGF reaction, it is suggested that this coke mitigating mechanism is inter-related with HDO and alkylated product formation and that the two processes utilize similar chemistries. Interestingly, the catalyst material exhibited an induction period for the first ~15 minutes TOS where the products increased at a rapid rate before leveling off to a steadier rate of increase. This phenomenon may be due to the formation of reactive intermediates on the surface of the catalyst that accumulate prior to developing a steady-state reactive phase. Catalyst life-cycle assessment may be conducted with concomitant regeneration optimization to assess catalyst behavior beyond 1-hour TOS for long-term stability. Under these conditions, it is possible that some of the coking was due to aerosols that passed through the filter media.

Referring again to FIG. 10 illustrating mass spectra for desorbed products evolved from Mo-HPA/TiO$_2$ post-reaction under (A) nitrogen and (B) H$_2$-regeneration protocol conditions using the same temperature and flowrate as with H$_2$, respectively. These spectra were obtained with the catalyst at 400° C. using a respective gas flowrate of 300 SCCM. The m/z values 78, 91, 94, 106, 120, 134, 142, 148, 156, 162, 170, 184, and 198 correspond to benzene, toluene, phenol, xylenes, trimethylbenzenes, tetramethylbenzenes, methyl-naphthalenes, pentamethylbenzenes, dimethyl-naphthalenes, hexamethylbenzenes, tri-, tetra-, and penta-methyl-naphthalenes, respectively. Various alkylated isomers were not distinguishable based on MBMS spectra and were denoted as the methylated derivatives.

The proposed hydrogen-based mitigation of coke-induced deactivation is further supported by the reduction in coke on the reacted catalyst in the presence of H$_2$ as shown in Table 1 for the Mo-HPA/TiO$_2$ catalyst used in pulsed-flow screening experiments. The coke was reduced from 13.4 wt % to 8.5 wt % with the addition of H$_2$. Moreover, in hydrogen, a potentiating effect is exhibited for the Mo-HPA/TiO$_2$ as coke was further reduced on the catalyst relative to the titania support for the materials used in the continuous-flow experiments. Here, coke was reduced from 7.2 wt % to 3.5 wt % with the addition of the Mo-HPA on the titania in H$_2$. In both instances, it is believed that hydrogen activation on either the TiO$_2$ and/or Mo-HPA/TiO$_2$ occurs followed by reaction with surface-adsorbed intermediate species; resulting hydrogenated products more readily desorb from the catalyst surface, thereby preventing further surface reactions that form coke. Coproduction of steam may further contribute to coke reduction in a similar fashion. This indicates that Mo-HPA promotes H$_2$ activation in addition to TiO$_2$, with a synergy potentially experienced between the two materials. Again, this may be due to charge-transfer and redox dynamics between the support and Mo atoms of the Mo-HPA catalyst. A summary of additional pre- and post-reaction catalyst characterization results for molybdenum and phosphorus content, surface area, and acid site density are shown in Table 1. The Mo-HPA loading on the titania support was determined based on the molybdenum content of the samples and the known weight fraction of molybdenum of the Mo-HPA (i.e. H$_3$PMo$_{12}$O$_{40}$). The molybdenum and phosphorus content, and therefore the Mo-HPA content, of the catalysts remained unchanged upon reaction. The BET surface area increased upon deposition of the Mo-HPA material on the titania support, while it remained unchanged upon reaction for both titania and Mo-HPA/TiO$_2$ materials. The increased surface area upon addition of Mo-HPA is expected due to the surface area enhancement imparted by the dispersed nanostructured Mo-HPA deposits on the low porosity titania support. The acid site density (combination of Brønsted and Lewis acid sites) of the Mo-HPA impregnated titania support was approximately 100 μmol/g greater than the native titania support. Upon reaction, the acid site density marginally increased for both the support and the Mo-HPA/TiO$_2$. The reducible nature of and subsequent oxygen deficient site formation on titania is believed to be responsible for this increase in acidity. The stability of these catalyst properties was expected since minimal deactivation was observed during the TOS experiments. These data are in agreement with lignin-derived model compound studies where a reacted molybdenum-based HPA catalyst maintained its Keggin-type structure and did not deactivate appreciably.

TABLE 1

Characterization of pulsed-flow (PF) and continuous-flow (CF) unreacted and reacted TiO$_2$ control and Mo-HPA/TiO$_2$ materials with and without H$_2$.

| Catalyst ID | | ICP-AES, Mo (wt %) | ICP-AES, P (wt %) | Mo-HPA Loading (wt %) | BET Surface Area (m$^2$/g) | NH$_3$ TPD (μmol/g) | Catalyst Coke (wt %) |
|---|---|---|---|---|---|---|---|
| Mo-HPA/TiO$_2$ (PF) | Reacted w/out H$_2$ | — | — | — | — | — | 13.4 |
| | Reacted w/H$_2$ | — | — | — | — | — | 8.5 |
| TiO$_2$ w/H$_2$ (Control) (CF) | Unreacted | — | — | — | 55 | 365 | — |
| | Reacted | — | — | — | 67 | 412 | 7.2 |
| Mo-HPA/TiO$_2$ w/H$_2$ (CF) | Unreacted | 9.1 | 0.4 | 14.4 | 97 | 480 | — |
| | Reacted | 9.2 | 0.4 | 14.6 | 101 | 497 | 3.5 |
| Mo-HPA/TiO$_2$ w/H$_2$ Regen. (CF) | Unreacted | 9.2 | 0.4 | 14.6 | 94 | 432 | — |
| | Reacted | 9.2 | 0.4 | 14.6 | 96 | 481 | 3.2 |

A char and ash balance surrounding the small pilot-scale pyrolyzer and associated HGF system was measured gravimetrically. Based on these measurements, 98.3 wt % of the char and ash was removed by the two-stage cyclone system with the balance of 1.7 wt % captured by the hot-gas filter unit. Within the cyclone system, 97.3 wt % of the char and ash was captured in the first cyclone, indicating that some embodiments may not require a second cyclone. Char and ash breakthrough past the hot-gas filter unit was not detected while ICP-AES analysis of condensed pyrolysis oil from the small pilot-scale pyrolyzer showed minor quantities of Na, K, Mg, and Ca with values of 6, 20, 54, and 74 ppm, respectively. Since char and alkali metals have been shown to promote aging of condensed bio-oils through accelerated polymerization reactions, the ability to remove these materials via cyclonic action coupled with hot-gas filtration is significant. Because most of the char and ash was captured in the first cyclone, in some embodiments the second cyclone may be eliminated (i.e. 525b of FIG. 3 could be eliminated in some embodiments).

Figure 11:
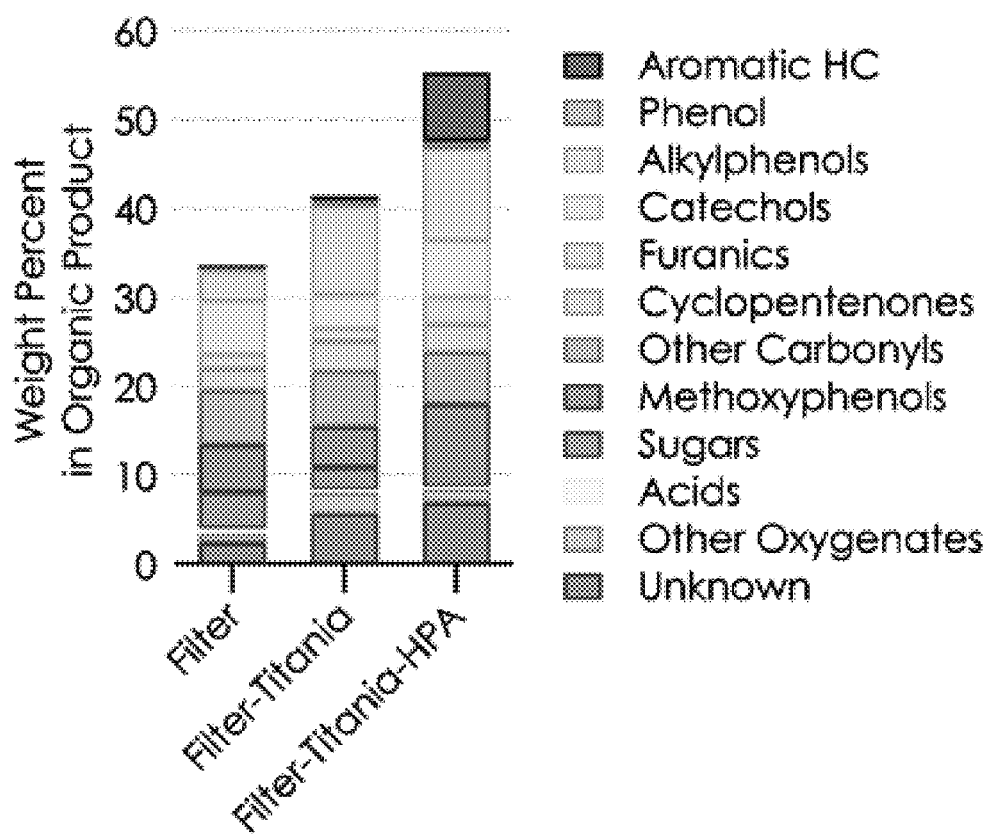
FIG. 11 illustrates the composition of condensed organic oil product for pine pyrolysis vapors partially upgraded via catalytic hot-gas filtration using a molybdenum heteropolyacid on titania catalyst, according to some embodiments of the present disclosure.

The hot-gas filtered pyrolysis vapors were condensed in the FCT system (shown schematically in FIG. 3 and FIG. 5) with both qualitative and quantitative analysis conducted on the liquid product samples. The impact of Mo-HPA/$TiO_2$ catalytic activity on pyrolysis vapor composition is shown in the GC-MS analysis of the condensed bio-oil product as indicated in FIG. 11. FIG. 11 represents the quantity of GC-detectable compounds per condition, where the increase in GC-detectable compounds when using a catalyst is consistent with upgrading and the concurrent reduction in primary vapors. The change in GC-detectable compounds as a function of upgrading accounts for the lower detectable yield shown in FIG. 11 for the filter alone (non-catalytic) since the heavy, non-upgraded species were not detected by the GC method. It is important to note that the group of compounds labelled "Unknown" refers to those compounds that were detected but not identified by the GC method employed. A summary of the bio-oil compositions of CHGF vapors for filter, filter with $TiO_2$, and filter with Mo-HPA/$TiO_2$ is provided in Table 3. When the filter was packed with the $TiO_2$, an increase in the percentage of alkylphenols from 3 wt % to 10 wt % relative to the filter was observed, and this effect was maintained upon the addition of the Mo-HPA (see FIG. 11).

Minor increases in phenol and cyclopentenones were observed using $TiO_2$. While alkylated phenols production was catalyzed by the $TiO_2$ support, aromatic hydrocarbons and methoxyphenols were further enhanced through the addition of the Mo-HPA to the support (see FIG. 11). The aromatic hydrocarbon class depicted in the plot comprises 1-ring, 2-ring, and 3-ring aromatic hydrocarbons and alkyl benzenes. These results confirm the real-time MBMS data, which also showed an enhancement of aromatic hydrocarbons and alkylation of aromatic rings along with the production of phenolic compounds. The presence of these upgraded products validates the results obtained in the pulsed-flow lab scale experiments and the scaled-up, continuous-flow system. In addition to hydrocarbons, alkylated phenols and methoxyphenols are chemical classes of interest as value-added chemicals since they are or can be converted to polymer precursors (e.g. phenol, cresols, and xylenols) via further upgrading processes like catalytic hydrodeoxygenation. In addition, cyclopentenones and other carbonyls (e.g. aromatic aldehydes or ketones) marginally decreased in the condensed bio-oil and increased in the gas phase (gas bag analysis) with the catalyst addition. The Mo-HPA/$TiO_2$ in the presence of hydrogen promotes the conversion of acids as demonstrated by the compositional analysis. GC-MS results show a reduction of ~4 wt % in the collected aqueous phase relative to a blank filter and a ~2 wt % reduction relative to the catalyst support. These results are presented in Table 4.

FIG. 11 illustrates the composition of condensed organic oil product, as determined by GC-MS, for pine pyrolysis vapors partially upgraded via catalytic hot-gas filtration (CHGF) using a molybdenum heteropolyacid on titania (15 wt % Mo-HPA/$TiO_2$) catalyst. From left-to-right: empty filter (control) with WHSV 1.0 $h^{-1}$ and 40 vol % $H_2$, filter with $TiO_2$ with WHSV 1.0 $h^{-1}$ and 40 vol % $H_2$, filter with 15 wt % Mo-HPA/$TiO_2$ with WHSV 1.0 $h^{-1}$ and 40 vol % $H_2$. All experiments conducted at 400° C.

To further investigate staged condensation of pyrolysis vapors partially upgraded using Mo-HPA/$TiO_2$, the distribution in mass fractions for several main compound classes (methoxyphenols, ketones and acids) was tracked across different condensation conditions. The product distribution between the fractions depends on vapor pressure, composition, and temperature of the pyrolysis mixture. Moreover, thermodynamic interactions between oxygenated compounds, heat-transfer characteristics of the condenser (tube-in-shell in this case), and residence time of vapor mixture in the heat exchanger can have a strong effect on the selective condensation efficiency as mentioned in other works.

Throughout the CHGF-FCT experiments, no product was captured in the first passive-cooled condenser shown in FIG. 3 and FIG. 5. The class-selective staged condensation was achieved by varying the ESP condensation stage temperature (heat exchanger with ESP) from low (70° C.) to high (170° C.) while keeping the third condensation stage (cold trap) temperature constant at −15° C. The tube-in-shell heat exchanger used in the third stage cold trap was designed to condense the compounds in the bio-oil according to their dew point, while the ESP stage actively removes entrained aerosols electrostatically and thermally. At 70° C., most of the organic phase was condensed in the ESP second stage while most of the aqueous phase was condensed in the third stage cold trap. At the condensation temperature of 170° C., sugars (e.g. levoglucosan) were collected in the ESP stage and the bio-oil phase was condensed together with the aqueous fraction contained in the cold trap. In the latter case, the aqueous phase was decanted from this composite oil-aqueous product with the resulting separated bio-oil and aqueous phases quantified gravimetrically and characterized independently. Fugitive vapors not captured in the third stage cold trap were subsequently captured in the coalescing filter as an organic phase. The bio-oil captured in the coalescing filter accounted for <5 wt % of total product recovered.

The organic phase collected in the second ESP condenser at 70° C. was nearly free of water (1.6 wt % water) as determined by Karl Fischer titration. Coupling CHGF with fractional condensation improved the ability to collect light organic components (<300° C. boiling point). A 42% decrease in heavies (pyrolytic lignin) collected in the heat exchanger (935B, in FIG. 5) and a 67% increase in light organics (935C, in FIG. 5) with the ESP condensation stage operated at 70° C. were observed. Separation of the heavy components of pyrolysis vapors is a significant challenge, and the reduction in the heavy component demonstrates the benefit of combining the two-unit operations to access chemicals and fuels from pyrolysis vapors. Normalized mass distributions between the ESP condenser and the cold trap of selected classes are provided in Table 2. These results show the ability to shift compounds between liquid products based on temperature. At 70° C., in the ESP condensation stage (second), the methoxyphenols were condensed primarily in the bio-oil fraction while upon increasing the temperature to 170° C. they were allowed to remain as vapor through the second stage until being condensed in the cold trap. Here, the aqueous and organic phases condensed together as a phase-separated composite. Methoxyphenols have a higher dew point where vapor saturation is reached at higher temperatures (>250° C.), and therefore at 70° C., the condenser can remove them effectively.

As shown in Table 2, slightly different behavior was observed for the ketones when condensed at 70° C. The total mass of cyclopentenones generated during pyrolysis tended to be distributed evenly between the ESP condenser stage and cold trap. The cyclopentenone compound class has a broad range of boiling points (and therefore dew points) which contribute to the distribution between the two stages. Hence, saturation in the ESP condensing stage could not be achieved for all compounds within the cyclopentenone class. For example, 2-cyclopenten-1-one, 2-hydroxy-3-methylhas a normal boiling temperature of 253° C. and is completely condensed into the first fraction at 70° C., while 2-cyclopenten-1-one has a lower normal boiling point (135° C.) and tended to condense within the cold trap. The same reasoning can be applied to the remaining ketones detected with compositional variations in distribution arising from differing dew points among the various ketones. When the condensation temperature was controlled to 170° C., all the cyclopentenones and the other ketones present in the vapors were completely condensed in the cold trap. The organic acids, including acetic acid, represented ~5 wt % of the mass collected in the ESP condensation stage at 70° C. Because these compounds possess low dew points, they remained as vapor at 70° C. and were therefore collected in the cold trap within the aqueous phase. This resulted in a deacidified bio-oil phase in the ESP condensation stage. These results show the difficulty in removing any specific class of compounds in high purity using a simple separation. However, the ability to remove crude fractions of unwanted compounds (e.g. acids) from the organic product through the combined use of partial upgrading via CHGF coupled to fractional condensation was demonstrated and has the potential to enhance bio-oil stability and mitigate downstream CFP catalyst deactivation and/or hydrotreating catalyst deactivation.

TABLE 2

Mass distribution of product classes between the condenser and the cold trap of the fractional condensation train.

| Chemical Class | Condenser Temperature (° C.) | Condenser Product (wt %) | Cold Trap Product (wt %) |
|---|---|---|---|
| Methoxyphenols | 70 | 94 | 6 |
|  | 170 | 0 | 100 |
| Ketones | 70 | 33 | 67 |
|  | 170 | 0 | 100 |
| Cyclopentenones | 70 | 59 | 41 |
|  | 170 | 0 | 100 |
| Carboxylic Acids | 70 | 5 | 95 |
|  | 170 | 0 | 100 |
| Water | 70 | <1 | >99 |
|  | 170 | <1 | >99 |

The product distributions obtained for the FCT system experiments conducted with CHGF using Mo-HPA/TiO$_2$ suggest that an average temperature between the two evaluated temperatures (70-170° C.) may be sufficient to isolate the majority of the ketones from the bio-oil, aside from trace-amounts of cyclopentenones. The results further indicate that, for temperatures below 170° C., the majority of the methoxyphenols can be retained in the organic oil phase within the ESP stage while simultaneously isolating most of the acids in the aqueous phase within the cold trap. Controlling product condensation in this fashion allows for the ability to densify, deacidify, and dewater the organic oil phase while concentrating alkylphenols within the same phase. Alternatively, at the higher ESP stage temperature of 170° C. where all upgraded product condensed in the downstream cold trap, the acids and carbonyls partitioned between the bio-oil and aqueous phases; partitioning of reactive carbonyls into the aqueous phase constitutes another means for enhancing bio-oil stability and catalyst lifetime in downstream processes since these species promote aging reactions in the condensed bio-oil phase and catalyst coking reactions in the vapor phase. In addition, the heavier aromatic hydrocarbons, alkylphenols, methoxyphenols, and polyalkylated benzenes generated during the upgrading using Mo-HPA/TiO$_2$ were collected completely in the condensed bio-oil phase within the ESP stage at 70° C. This demonstrates our intended separation control towards targeted alkylphenols and methoxyphenols as value-added chemicals. Additional stages within the FCT may prove useful in enhancing separations control over targeted cyclopentenones.

The efficiency of the FCT in capturing product was assessed via mass balance using Mo-HPA/TiO$_2$CHGF replicates (WHSV of 1 h$^{-1}$, 40 vol % H$_2$) with the FCT ESP stage at 170° C. These data are shown in Table 5 in conjunction with mass balance data for when the FCT ESP stage was at 70° C. The mass balance closure for the Mo-HPA/TiO$_2$ replicate experiments was 97.3±3.3 wt % with 45.2 wt % residing as gaseous product, 3.5 wt % lost to catalyst coke, 33.5 wt % aqueous product, and 15.1 wt % as organic oil product. In comparison, the filter with TiO$_2$ control exhibited a mass balance closure of 96.6 wt % with 48.0 wt % residing as gaseous product, 7.2 wt % lost to catalyst coke, 15.9 wt % aqueous product, and 25.5 wt % organic oil product. The filter control without packing yielded a mass closure of 92.0 wt % with 43.1 wt % gaseous product, non-detectable coke loss, 24.4 wt % aqueous phase, and 24.1 wt % organic oil product. The gas yields were high due to thermal cracking of pyrolysis vapors in the small pilot-scale pyrolyzer system prior to their delivery to the CHGF unit. The pyrolyzer was not optimized for pyrolysis vapor quality prior to experiments. An optimized pyrolyzer may improve vapor quality by reducing the light gas yield while concomitantly increasing the viable upgradable vapor yield. A reduction in the bio-oil product yield in the Mo-HPA/TiO$_2$ can be attributed to much of the upgraded product being volatile and not efficiently condensed in the FCT. Partial deoxygenation also removes oxygen as water, evidenced by the increase in aqueous phase when using catalyst. Previous work indicated a negative correlation to bio-oil yield and degree of deoxygenation. Note that the mass balances were comparable for the two ESP stage temperatures investigated (70° C. and 170° C.).

CHGF as described by some embodiments herein was successfully used to condition biomass fast pyrolysis vapors provided by a continuous-flow small pilot-scale pyrolyzer unit by integrating a catalytic component based on a heteropolyacid into an HGF unit. This CHGF process in combination with a cyclone system produced clean (i.e. no particulates and low alkali metals) and partially upgraded fast pyrolysis vapors for either fractional condensation or downstream catalytic upgrading. Produced vapors contained increased quantities of aromatic and alkylated hydrocarbons. Both hydrodeoxygenation and alkylation reactions were essential in the partial conversion of the pine-derived oxygenates. In the combined process, the removal of alkali metals stabilizes associated pyrolysis and upgraded bio-oils, while the partial deoxygenation (i.e. removal of reactive oxygen moieties) enhances CFP by reducing coke formation and promoting improved bio-oil stability. The efficient capturing of char and alkali particulate at the HGF indicates that a single cyclone for entrained solids removal may suffice, thereby allowing for the elimination of the second cyclone typically employed in ex situ CFP.

In some embodiments, coupling the catalytic preconditioning of pyrolysis vapors via CHGF with controlled condensation demonstrated an additional means for enhancing bio-oil stability while preserving carbon for downstream upgrading and production of carbon-carbon coupled species for tailoring fuel end-product properties. Controlled condensation provided phase separation between organic oil and aqueous products. Controlled condensation additionally allowed for the targeted condensation of heavy aromatic hydrocarbons, alkylphenols, and methoxyphenols within the bio-oil phase and reactive acid carbonyls within the aqueous phase. On the contrary, the distribution of ketones spanned both the bio-oil and aqueous phases, suggesting that additional FCT stages may be necessary for improving their separation. This chemical tailoring of either vapor phase or condensed phase product composition is a viable option for enhancing downstream upgrading within CFP and/or hydrotreating via foulant removal. Value-added product separation using FCT represents an additional enhancement to the upgrading process; polymer precursors have the potential to offset process capital costs. The CHGF and FCT unit operations together offer a low CapEx approach for enhancing bio-oil stability, product composition, and overall efficiency within CFP processing of biomass fast pyrolysis vapors to selected fuels and chemicals.

TABLE 3

GC-MS characterization of organic oil product from catalytic hot-gas filtration.

| Chemical Class | | Blank Filter w/$H_2$ | Filter with $TiO_2$ w/$H_2$ | Filter with Mo-HPA/$TiO_2$ w/$H_2$ |
|---|---|---|---|---|
| Weight Percent in Product | Aromatic Hydrocarbons | 0.06 | 0.45 | 7.70 |
| | Phenol | 0.22 | 0.68 | 0.85 |
| | Alkylphenols | 3.43 | 10.10 | 10.37 |
| | Catechols | 5.96 | 3.75 | 6.33 |
| | Furanics | 1.62 | 1.41 | 3.11 |
| | Cyclopentenones | 2.43 | 3.46 | 3.10 |
| | Other Carbonyls | 6.12 | 6.21 | 5.91 |
| | Methoxyphenols | 5.34 | 4.58 | 9.26 |
| | Sugars | 4.05 | 2.51 | 0.00 |
| | Carboxylic acids | 0.68 | 0.28 | 0.24 |
| | Other Oxygenates | 0.96 | 2.41 | 1.47 |
| | Unknown | 2.39 | 5.62 | 6.95 |
| | Total | 33.26 | 41.46 | 55.29 |

TABLE 4

GC-MS characterization of aqueous product from catalytic hot-gas filtration.

| Chemical Class | | Blank Filter w/$H_2$ | Filter with $TiO_2$ w/$H_2$ | Filter with Mo-HPA/$TiO_2$ w/$H_2$ |
|---|---|---|---|---|
| Weight Percent in Product | Aromatic Hydrocarbons | 0.02 | 0.00 | 0.11 |
| | Phenol | 0.10 | 0.13 | 0.07 |
| | Alkylphenols | 0.29 | 0.30 | 0.15 |
| | Catechols | 0.14 | 0.00 | 0.81 |
| | Furanics | 1.06 | 0.86 | 0.81 |
| | Cyclopentenones | 1.03 | 0.75 | 0.34 |
| | Other Carbonyls | 2.70 | 1.42 | 0.89 |
| | Methoxyphenols | 0.39 | 0.16 | 0.34 |
| | Sugars | 0.14 | 0.00 | 0.29 |
| | Carboxylic acids | 6.04 | 4.23 | 2.30 |
| | Other Oxygenates | 0.11 | 0.00 | 0.12 |
| | Unknown | 1.04 | 0.33 | 0.50 |
| | Total | 13.06 | 8.18 | 6.73 |

TABLE 5

Mass balance results for catalytic hot-gas filter (CHGF) experiments with the ESP second stage condenser (see FIG. 5) at 70° C. and 170° C.. Experiments were conducted using 15 wt % molybdenum heteropolyacid on titania (15 wt % Mo-HPA/$TiO_2$) with a weight-hourly space velocity (WHSV) of 1.0 $h^{-1}$ and 40 vol % $H_2$.

| Product Type | | Second Stage @ 70° C. (wt %) | Second Stage @ 170° C. (wt %) |
|---|---|---|---|
| Liquids Product | Aqueous | 30.20 | 33.50 |
| | Bio-Oil | 22.00 | 15.10 |
| Gaseous Product | Subtotal | 52.20 | 48.60 |
| | Total | 44.60 | 45.20 |
| Solids | Catalyst Coke | 3.5 | 3.5 |
| Product | Mass Balance Closure (Total) | 100.3 | 97.30 |

Figure 12:
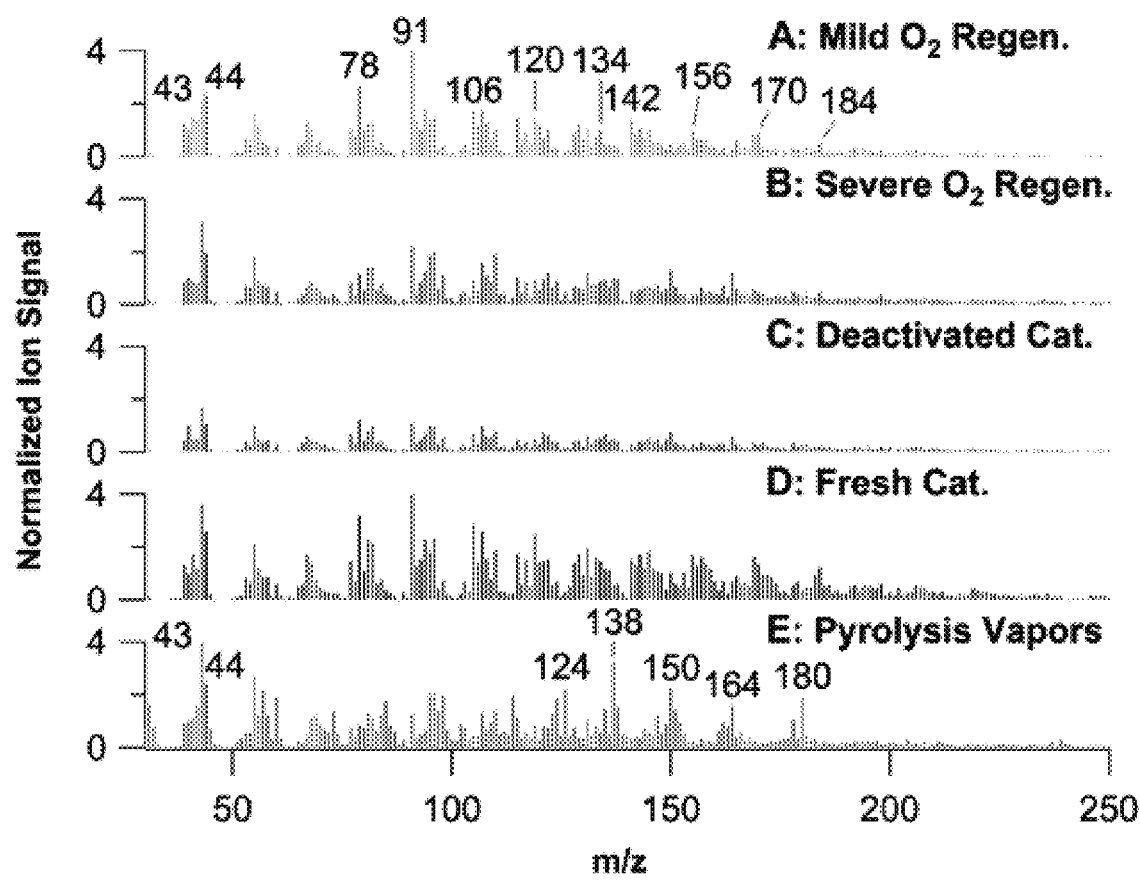
FIG. 12 shows mass spectra for pulsed-flow partial upgrading of pine pyrolysis vapors post oxidative regeneration of molybdenum heteropolyacid on titania and associated controls, according to some embodiments of the present disclosure.
Figure 13:
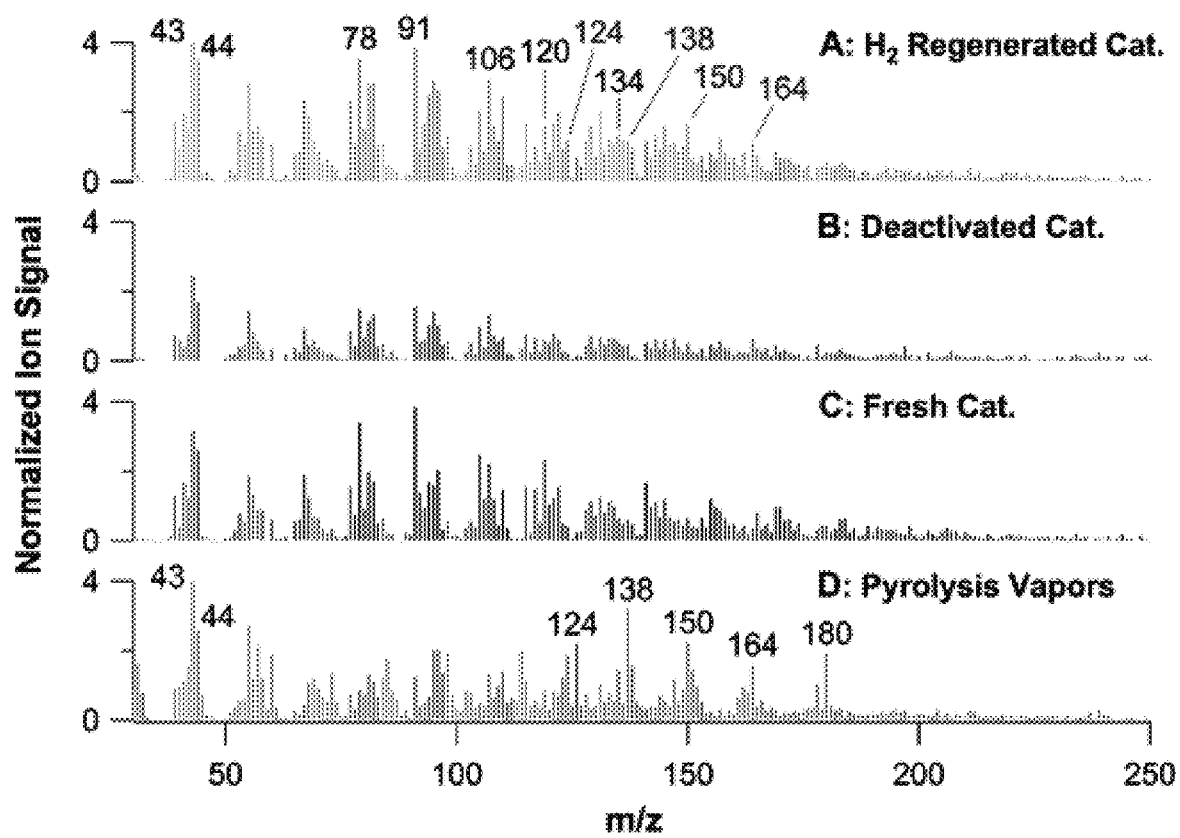
FIG. 13 shows spectra for pulsed-flow partial upgrading of pine pyrolysis vapors post reductive regeneration of molybdenum heteropolyacid on titania and associated controls, according to some embodiments of the present disclosure.

Lab scale pulsed-flow catalyst regeneration studies demonstrated varying abilities to successfully regenerate deactivated molybdenum heteropolyacid on titania (15 wt % Mo-HPA/$TiO_2$) using oxidative ($O_2$) and reductive ($H_2$) conditions to remove coke from the catalyst. Regeneration studies were conducted using the pulsed-flow lab scale horizontal quartz reactor system (coupled to a molecular beam mass spectrometer (MBMS) for real-time analysis of products). These studies involved first deactivating the catalyst by upgrading pine pyrolysis vapors incrementally to a biomass-to-catalyst ratio of 1.5 at 400° C. with a vapor weight-hourly space velocity (WHSV) of 2 $h^{-1}$. Deactivated catalysts were then regenerated using either $O_2$ or $H_2$, followed by again upgrading vapors to a biomass-to-catalyst ratio 1.5 at 400° C., WHSV of 2 $h^{-1}$, while monitoring product distribution via MBMS. Oxidative regeneration of the catalyst was conducted using both mild and severe treatment conditions. Mild $O_2$ regeneration consisted of treating the deactivated catalyst with 5 vol % $O_2$ in He at 425° C. at a flowrate equivalent to WHSV of 2 $h^{-1}$ for 30 min (MBMS-monitored $CO_2$ signals decreased to zero within 5 min, indicating complete coke removal occurred prior to 30 min) before being passively cooled to 400° C. Severe $O_2$ regeneration conditions consisted of ramping the catalyst to 550° C. at 3° C./min under 21 vol % $O_2$ in He, holding for 4 h, then passively cooling to 400° C. in He; all flowrates being equivalent to 2 $h^{-1}$. FIG. 12 shows MBMS spectra for pulsed-flow partial upgrading of pine pyrolysis vapors post mild (see Plot A of FIG. 12) and severe (see Plot B of FIG. 12) $O_2$ regeneration of Mo-HPA/$TiO_2$ compared to upgraded vapor spectra for deactivated (see Plot C of FIG. 12 (10)) and fresh Mo-HPA/$TiO_2$ (see Plot D of FIG. 12), and pure pyrolysis vapors (see Plot E of FIG. 12). Severe $O_2$ treatment (see Plot B of FIG. 12) demonstrated a reduction in catalyst activity post regeneration, while mild $O_2$ treatment (see Plot A of FIG. 12) demonstrated successful recovery of catalyst activity post regeneration compared to fresh catalyst. Pulsed-flow $H_2$ regeneration (see Plot A of FIG. 13) was semi-successful, demonstrating partial recovery of upgrading activity with concomitant breakthrough of primary pyrolysis vapor products. FIGS. 12 and 13 used the same controls: deactivated catalyst, fresh catalyst, and pure pyrolysis vapors. The m/z values 78, 91, 106, 120, 134, 142, 156, 170, and 184 correspond to upgraded products benzene, toluene, xylenes, trimethylbenzenes, tetramethylbenzenes, naphthalene, mono-, di-, tri-, and tetra-methyl-naphthalenes, respectively. The m/z values 124, 138, 150, 164, and 180 correspond to primary vapor products: guaiacol, methyl-guaiacol, 4-vinyl-guaiacol, isoeugenol, and coniferyl alcohol. Catalyst coke was completely removed via both $O_2$ regeneration procedures while only partially removed via $H_2$ regeneration.

FIG. 12 shows mass spectra for pulsed-flow partial upgrading of pine pyrolysis vapors post oxidative ($O_2$) regeneration of molybdenum heteropolyacid on titania (15 wt % Mo-HPA/$TiO_2$) and associated controls (plots (C)-(E)). (A) partial upgrading of pine pyrolysis vapors with Mo-HPA/$TiO_2$ and 50 vol % $H_2$ post mild $O_2$ regeneration, (B) partial upgrading of pine pyrolysis vapors using Mo-HPA/$TiO_2$ and 50 vol % $H_2$ post severe $O_2$ regeneration, (C) partial upgrading of pine pyrolysis vapors using deactivated Mo-HPA/$TiO_2$ and 50 vol % $H_2$, (D) partial upgrading of pine pyrolysis vapors using fresh Mo-HPA/$TiO_2$ and 50 vol % $H_2$, and (E) pure pine pyrolysis vapors at a flowrate equivalent to WHSV of 2.0 $h^{-1}$ without $H_2$. All experiments conducted at 400° C. using a pyrolysis vapor WHSV of 2.0 $h^{-1}$. The m/z values 78, 91, 106, 120, 134, 142, 156, 170, and 184 correspond to benzene, toluene, xylenes, trimethylbenzenes, tetramethylbenzenes, naphthalene, mono-, di-, tri-, and tetra-methyl-naphthalenes, respectively. The m/z values 124, 138, 150, 164, and 180 correspond to primary vapor products: guaiacol, methyl-guaiacol, 4-vinyl-guaiacol, isoeugenol, and coniferyl alcohol. Various alkylated isomers are not distinguishable based on MBMS spectra and were denoted as the methylated derivatives. (*m/z=43 is a carbohydrate fragment and m/z=44 is carbon dioxide.)

FIG. 13 shows spectra for pulsed-flow partial upgrading of pine pyrolysis vapors post reductive ($H_2$) regeneration of molybdenum heteropolyacid on titania (15 wt % Mo-HPA/$TiO_2$) and associated controls (plots (B)-(D)). (A) partial upgrading of pine pyrolysis vapors with Mo-HPA/$TiO_2$ and 50 vol % $H_2$ post $H_2$ regeneration, (B) partial upgrading of pine pyrolysis vapors using deactivated Mo-HPA/$TiO_2$ and 50 vol % $H_2$, (C) partial upgrading of pine pyrolysis vapors using fresh Mo-HPA/$TiO_2$ and 50 vol % $H_2$, and (D) pure pine pyrolysis vapors at a flowrate equivalent to WHSV of 2.0 $h^{-1}$ without $H_2$. All experiments conducted at 400° C. using a pyrolysis vapor WHSV of 2.0 $h^{-1}$. The m/z values 78, 91, 106, 120, and 134 correspond to benzene, toluene, xylenes, trimethylbenzenes, and tetramethylbenzenes, respectively. The m/z values 124, 138, 150, 164, and 180 correspond to primary vapor products: guaiacol, methyl-guaiacol, 4-vinyl-guaiacol, isoeugenol, and coniferyl alcohol. Various alkylated isomers are not distinguishable based on MBMS spectra and were denoted as the methylated derivatives. (*m/z=43 is a carbohydrate fragment and m/z=44 is carbon dioxide.)

Figure 14:
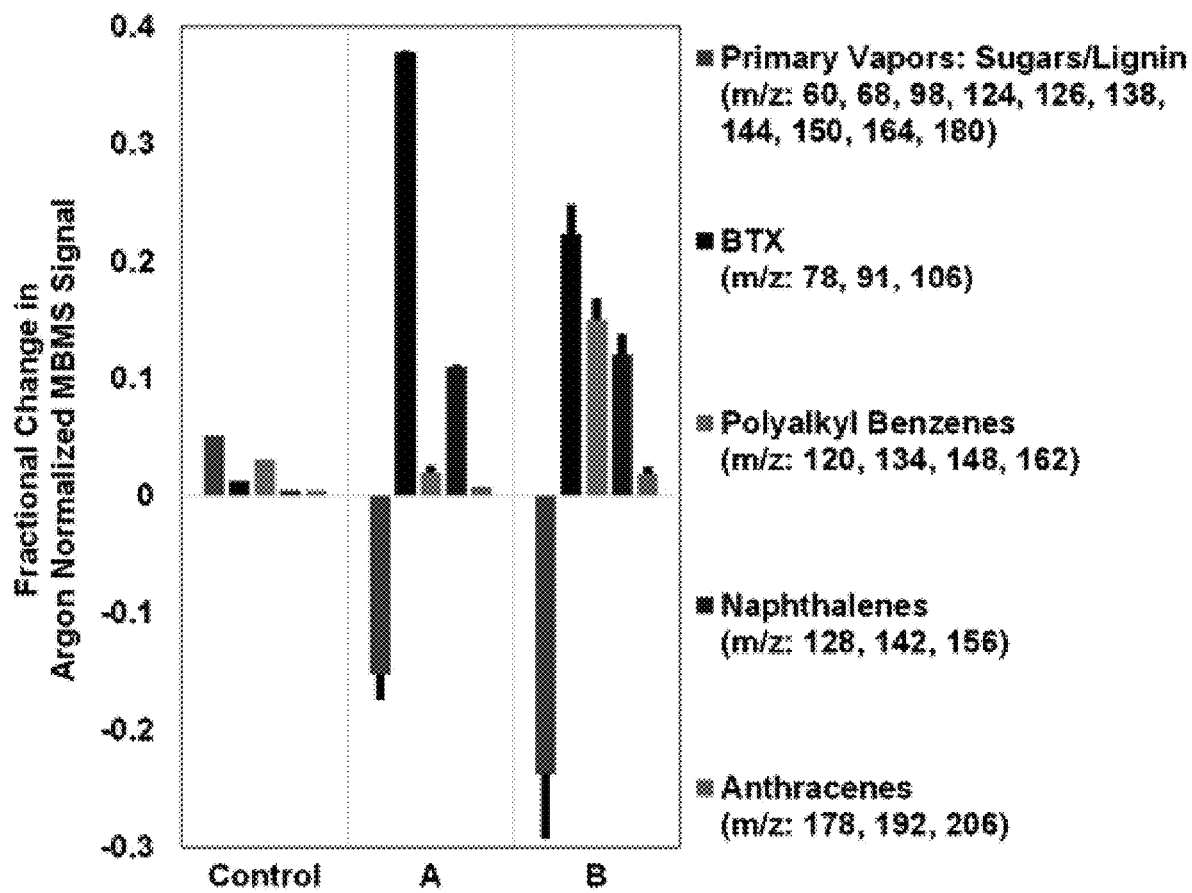
FIG. 14 shows mass spectra difference data plots for continuous-flow partial upgrading of pine pyrolysis vapors using HZSM-5, molybdenum heteropolyacid on titania, and associated controls, according to some embodiments of the present disclosure.

Continuous-flow catalyst screening experiments were conducted in a similar fashion as discussed above for two catalysts; Mo-HPA/$TiO_2$ and HZSM-5 (Zeolyst, CBV 5524G CY(1.6), silica-to-alumina ratio of 50, cylindrical extrudates; 1 mm×3 mm). The Mo-HPA/$TiO_2$ was prepared and tested (i.e. 400° C., WHSV of ~1 $h^{-1}$, 40 vol % $H_2$, and 60 minutes time-on-stream (TOS)) while the HZSM-5 was tested in the same manner but without added $H_2$. Each catalyst was tested in triplicate. Difference plot MBMS spectral data for the two catalysts is shown in FIG. 14. The difference plots were generated from argon-normalized MBMS composite signals. The composite signals were grouped into five categories: sugar- and lignin-derived pine primary pyrolysis vapors, BTX, polyalkyl benzenes, naphthalenes, and anthracenes. In FIG. 14, Control represents empty filter without $H_2$ data subtracted from empty filter with $H_2$ data (i.e. Filter with $H_2$-Filter), A represents empty filter data subtracted from filter with HZSM-5 data (i.e. Filter/HZSM-5-Filter), and B represents empty filter with $H_2$ data subtracted from filter with Mo-HPA/$TiO_2$ with $H_2$ data (i.e. Mo-HPA/$TiO_2$ with $H_2$-Filter with $H_2$). Good agreement was achieved between replicates with standard deviation bars shown in FIG. 14. HZSM-5 showed enhanced BTX production without the need for $H_2$ while Mo-HPA/$TiO_2$ with $H_2$ exhibited enhanced alkylation activity as indicated by enhanced production of polyalkylbenzenes, naphthalenes, and anthracenes compared to HZSM-5.

FIG. 14 shows mass spectra difference data plots for continuous-flow partial upgrading of pine pyrolysis vapors using HZSM-5, molybdenum heteropolyacid on titania (15 wt % Mo-HPA/$TiO_2$), and associated control. Difference plots show conversion of primary pyrolysis vapors (sugar- and lignin-derived) to benzene, toluene, and xylene (BTX); polyalkyl benzenes; naphthalenes; and anthracenes upon catalyst addition. Control represents empty filter without $H_2$ data subtracted from empty filter with $H_2$ data (i.e. Filter with $H_2$-Filter), A represents empty filter data subtracted from filter with HZSM-5 data (i.e. Filter/HZSM-5-Filter), and B represents empty filter with $H_2$ data subtracted from filter with Mo-HPA/$TiO_2$ with $H_2$ data (i.e. Mo-HPA/$TiO_2$ with $H_2$ filter with $H_2$). Catalyst experiments were conducted in triplicate with standard deviation bars shown. All experiments implemented a weight-hourly space velocity (WHSV) of 1.0 $h^{-1}$ at 400° C.

Figure 15:
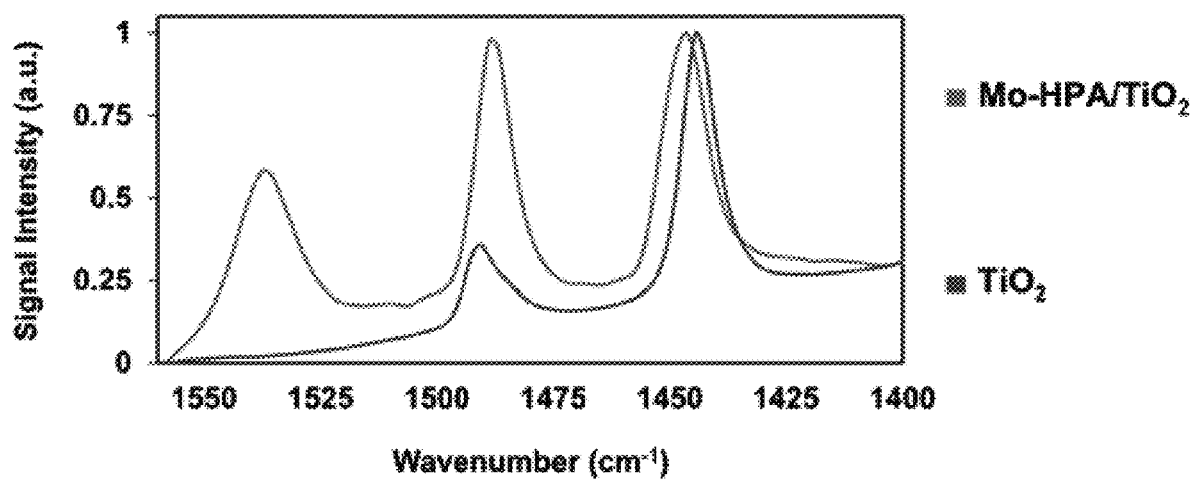
FIG. 15 shows acid site characterization via pyridine adsorption diffuse reflectance Fourier transform infrared spectroscopy (py-DRIFTS) spectra for molybdenum heteropolyacid on titania and titania catalyst supports, according to some embodiments of the present disclosure.

The acid site character of the Mo-HPA/$TiO_2$ catalyst and associated titania ($TiO_2$) catalyst support was evaluated using pyridine adsorption diffuse reflectance Fourier transform infrared spectroscopy (py-DRIFTS). Spectra shown in FIG. 15 represent the average of 64 scans collected at 4 $cm^{-1}$ resolution using a Thermo Nicolet iS50 FT-IR spectrometer equipped with a Harrick Praying Mantis reaction chamber. The py-DRIFTS characterization procedure was comprised of a $H_2$ pretreatment step, $H_2$ purge step, pyridine exposure step, excess pyridine purge step, and an analysis step. Pretreatment involved ramping samples to 400° C. at 10° C./min in a 5 vol % $H_2$/Ar gas mixture flowing at 100 mL/min. Pretreated samples were cooled to 150° C. at 10° C./min in 100 mL/min Ar and then held to purge for 10 min. Purged samples were subsequently exposed to pyridine at 150° C. for 10 min by flowing 100 mL/min Ar through a pyridine-filled bubbler held at room temperature and atmospheric pressure. Pyridine-treated samples were then purged of excess pyridine using 100 mL/min Ar for 10 min prior to analysis. Py-DRIFTS spectra were collected using a KBr background. The vibrational modes at ~1447 $cm^{-1}$ and ~1537 $cm^{-1}$ are attributed to pyridine coordination with Lewis and Brønsted acid sites, respectively, while the mode near ~1490 cm-1 is a composite signal due to both types of sites. The addition of Mo-HPA to the Lewis acidic titania support was shown to add Brønsted acidity, imparting hydrodeoxygenation (HDO) and alkylating activity to Mo-HPA/$TiO_2$ and yielding catalytic bifunctionality.

Figure 16:
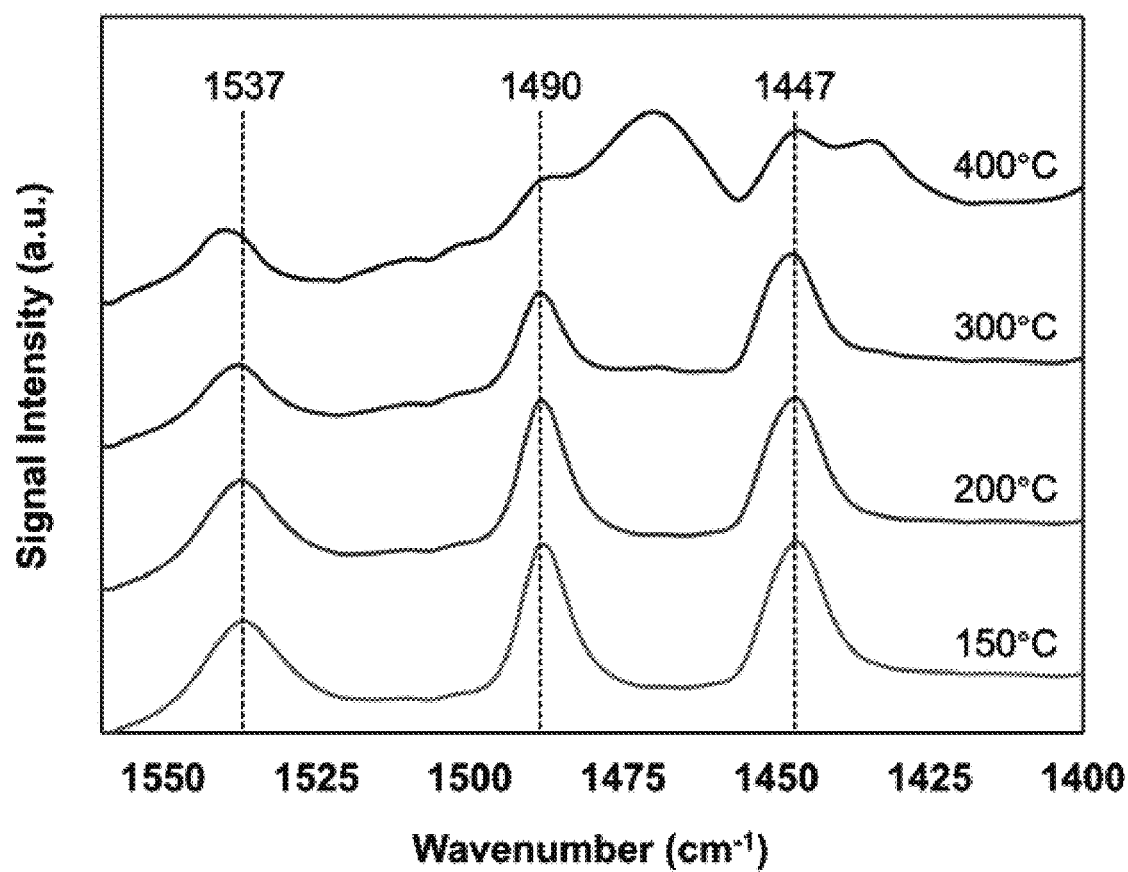
FIG. 16 shows acid site thermal stability via pyridine adsorption diffuse reflectance Fourier transform infrared spectroscopy (py-DRIFTS) spectra for molybdenum heteropolyacid on titania at increasing treatment temperatures, according to some embodiments of the present disclosure.

To assess Mo-HPA/$TiO_2$ acid site thermal stability, catalyst samples were thermally treated throughout a series of temperatures for 10 min in 100 mL/min Ar prior to being analyzed at 150° C. via py-DRIFTS; a temperature ramp-rate of 10° C./min was used for all acid site stability tests. FIG. 16 shows py-DRIFTS spectra for Mo-HPA/$TiO_2$ thermally treated at 150° C., 200° C., 300° C., and 400° C. before being analyzed. Lewis and Brønsted acid site character was retained for each thermally treated sample, indicating thermal stability up to 400° C. for Mo-HPA/$TiO_2$ acid sites. For the 400° C. treatment, peaks associated with Lewis and Brønsted were convoluted with additional py-DRIFTS signatures. Further investigation is required to determine the implication of these additional py-DRIFTS signatures.

FIG. 15 shows acid site characterization via pyridine adsorption diffuse reflectance Fourier transform infrared spectroscopy (py-DRIFTS); spectra for molybdenum heteropolyacid on titania (15 wt % Mo-HPA/TiO$_2$) and titania (TiO$_2$) catalyst support. Vibrational modes at 1447 cm$^{-1}$ and ~1537 cm$^{-1}$ are attributed to pyridine coordination with Lewis and Brønsted acid sites, respectively. The vibrational mode at 1490 cm$^{-1}$ is indicative of both Lewis and Brønsted acid sites.

FIG. 16 shows acid site thermal stability via pyridine adsorption diffuse reflectance Fourier transform infrared spectroscopy (py-DRIFTS); spectra for molybdenum heteropolyacid on titania (15 wt % Mo-HPA/TiO$_2$) at increasing treatment temperatures. All py-DRIFTS analysis conducted at 150° C. Vibrational modes at 1447 cm$^{-1}$ and 1537 cm$^{-1}$ are attributed to pyridine coordination with Lewis and Brønsted acid sites, respectively. The vibrational mode at 1490 cm$^{-1}$ is indicative of both Lewis and Brønsted acid sites.

Methods:

Loblolly pine biomass feedstock (i.e. feed stream) was utilized for the testing described herein, although other feedstocks may be used. Other feedstocks may include other sources of biomass, municipal solid waste, and/or synthetic fuels. The loblolly pine biomass feedstock was provided in nominal size <2 mm with subsequent knife-milling to <1 mm prior to being used. Carbon, hydrogen, and nitrogen (CHN) and proximate analysis indicated the composition of the pine on a dry basis to be approximately 51.0 wt % carbon, 6.2 wt % hydrogen, 0.1 wt % nitrogen, 42.6 wt % oxygen (by difference), and 0.4 wt % ash. The pine was further characterized as approximately 42 wt % cellulose, 21 wt % hemicellulose, and 30 wt % lignin.

In testing, titania-supported molybdenum (Mo-HPA/TiO$_2$) and tungsten heteropolyacid (W-HPA/TiO$_2$) catalyst materials were prepared. Titania (Alfa Aesar, anatase, #44429) was ground and sieved to a particle size of 1.4-2.0 mm. The catalysts were prepared for testing via incipient wetness impregnation of the TiO$_2$ support using an aqueous solution containing either 15 wt % phosphomolybdic acid hydrate (Sigma-Aldrich, #221856) or phosphotungstic acid (Sigma-Aldrich, #P4006). The resulting samples were dried at 120° C. for approximately 18 hours.

In testing, the initial Mo-HPA/TiO$_2$ and W-HPA/TiO$_2$ catalyst screening experiments were accomplished via a pulsed-flow lab scale horizontal quartz reactor system coupled to a molecular beam mass spectrometer (MBMS) for real-time analysis of products. The reactor employed a tubular packed-bed geometry (i.e. axial flow path) with 12.7 mm internal diameter. Pulsed-flow biomass feeding was implemented because of its ease of operation at the lab scale for the catalyst screening experiments. In the testing, loblolly pine was pyrolyzed at 500° C. in a flow of He or H$_2$/He mixture and the resulting vapors subsequently upgraded at 400° C. over 0.5 g of each type of catalyst. The resulting upgraded vapors were swept into the MBMS for analysis. Biomass increments of 30 mg were added via quartz boats to give a cumulative biomass-to-catalyst ratio of 1.5 (25 boats) and vapor weight-hourly space velocity (WHSV) of approximately 2 h$^{-1}$. It was assumed that in the thermocatalytic conversion of lignin model phenolics (e.g. anisole and 4-propylguaiacol) over a Mo-HPA/TiO$_2$ catalyst H$_2$ was necessary to promote HDO and alkylation reactions via Lewis and Brønsted acidic site activation. Therefore, experiments were conducted with 10 vol % and 50 vol % H$_2$ (balance He). The reaction temperature (400° C.) was chosen based on the thermal stability of the HPA and TiO$_2$. Elevated temperatures (>500° C.) induce a phase transition from anatase-to-rutile, where anatase is the preferred phase. Additionally, pyrolysis vapors tend to condense below 400° C. All catalyst experiments were tested against corresponding control experiments using the TiO$_2$ support. Pulsed-flow lab scale experimental results were used to guide the continuous-flow experiments described in the following section.

Real-time analysis of products was accomplished via the MBMS slipstream on the CHGF setup. Condensed liquid product from the FCT system was quantified gravimetrically and analyzed via GC-MS and Karl Fischer titration while non-condensable gases were analyzed via a GC-FID equipped with a Polyarc® universal carbon detector (Activated Research Company). The Polyarc® employs a catalytic methanation reaction to convert all GC-separated species into methane prior to FID analysis (i.e. normalizes response factors to 1) to provide for a uniform carbon quantification (i.e. carbon number). The total mass of non-condensable products was determined from the average molecular weight of the product gas, the molar concentration of carbon detected from the Polyarc® and the total volumetric flow through the CHGF system. The average molecular weight of the product gas was determined from the weight fractions and molecular weights of the quantified species. Quenched pyrolysis oil product from the small pilot-scale pyrolyzer was analyzed for alkali metals content via ICP-AES. Mass balances were completed around the replicate experiments by comparing the gravimetric yields of condensable FCT fractions and non-condensable products to those obtained for the filter housing with filter control. The degree of char and alkali removal was assessed gravimetrically through a char and ash balance surrounding the small pilot-scale pyrolyzer and associated HGF system. Both the TiO$_2$ control and Mo-HPA/TiO$_2$ materials were analyzed, pre- and post-reaction, for metals composition via inductively coupled plasma atomic emission spectroscopy (ICP-AES), surface area via Brunaur, Emmett, and Teller (BET), acid site density via temperature-programmed desorption with ammonia (NH$_3$ TPD) and combined Brønsted and Lewis acidity, and coke deposition (gravimetrically) to assess reaction-induced changes as they relate to morphology and deactivation. Prior to ICP-AES, BET, and TPD analysis, both pre- and post-reaction catalyst materials were calcined in air. The calcination protocol entailed heating in air using a muffle furnace to 550° C. at 3° C./min, holding for 4 h, and then passively cooling to ambient temperature. Further details regarding the analytical methods employed are provided below.

The molecular beam mass spectrometer (MBMS) slipstream indicated in FIG. 3 employed an Extrel Core Mass Spectrometer system for real-time analysis of hot product vapors. The MBMS slipstream product sample undergoes adiabatic expansion through a 250 µm orifice into a vacuum chamber held at ~50 mtorr, which rapidly cools the product stream, effectively freezing the chemistry and hindering further reactions. The resulting cooled product gas is then skimmed into a molecular beam to be positively ionized prior to being mass-resolved and analyzed via a quadrupole mass spectrometer. As MBMS separates and identifies compounds based on mass (m/z) and because the system has a resolution of 0.1 amu, full speciation was not achieved, leaving isomers unresolved. Speciation of pyrolysis and CFP products has been conducted on similar systems by others. All MBMS data was acquired using the Merlin Automation Data System (version 1.20.1827.0) supplied by Extrel where data was collected over an m/z range of 30-510 in centroid mode with no averaging and a scan time of one second. Ion formation within the mass spectrometer was achieved via electron impact ionization employing a potential of −20.0 eV. The MBMS system was calibrated using perfluorotributylamine (PFTBA) standard in profile mode to ensure peak widths of respective m/z values were within ±0.5 amu of the target value. An argon tracer introduced through the pilot-scale pyrolyzer was used throughout all experiments to correct for MBMS signal drift. For data analysis, the MBMS spectral intensity was normalized against argon prior to being background subtracted.

Gas bag analysis was conducted via GC-FID equipped with a Polyarc® universal carbon detector (Activated Research Company). The Polyarc® employs a catalytic methanation reaction to convert all GC-separated species into methane prior to FID analysis (i.e. normalizes response factors to 1) to provide for a uniform carbon quantification (i.e. carbon number). An HP 6890 GC was employed using a 250 μm sample loop. The column used for separation of compounds was a 60 m×0.32 mm Agilent J&W GS-GasPro (Catalog #: 113-4362). The GC oven temperature was held at 32° C. for 1 min, ramped to 175° C. at 25° C./min, held for 2 min and then ramped to 250° C. at 25° C./min and held for 6 min. The inlet temperature was 250° C., FID temperature 315° C., and Polyarc® temperature of 293° C. The system employed a helium carrier gas flowrate of 3.3 mL/min without a split ratio. Three calibration standards containing varying concentrations of 17 compounds were used to quantify all compounds detected in the samples. These standards included carbon monoxide, carbon dioxide, methane, acetylene, ethylene, ethane, propylene, propane, 1,3-butadiene, 1-butene, isobutylene, cis-2-butene, trans-2-butene, n-butane, isobutane, n-pentane, and isopentane.

Prior to GC-MS analysis, organic samples were diluted 20:1 in acetone and aqueous samples were diluted 1:1 in methanol. A volume of 1 μL was injected onto an Agilent G1530A GC-HP 5973 MS. Gas samples were injected onto the same instrument; 1 mL injections. The column used for separation of compounds was a 30 m×0.25 mm×0.25 μm Restek Rtx-50 (50%-phenyl-methylpolysiloxane phase). The GC oven temperature was held at 40° C. for 2 min, ramped to 140° C. at 7° C./min, then to 290° C. at 12° C./min and held for 5 min. The inlet temperature was 250° C., transfer line temperature 300° C., and an employed helium carrier gas flowrate of 1 mL/min with a split ratio of 10:1. A calibration standard containing 20 compounds was used to quantify all compounds detected in the samples. For determining water content of the organic and aqueous samples, Karl Fischer (KF) titration was conducted using aliquots of ~0.1 g, with each aliquot weighed before going into the titration cell. Titration was done with a 701KF Titrino unit, using CombiTitrant 5 (Merck) titrant. Calibration of titrant was done before any samples were run using 1% water in 1-methoxy-2-propanol standard (Merck). Samples are added directly to anhydrous methanol in the titration cell for KF moisture determination.

Alkali metals analysis of organic samples was conducted via ICP-AES. Approximately 0.5 g of each bio-oil was weighed out in triplicate and placed in a Teflon pressure vessel. Ten mL of 72 wt % nitric acid (reagent grade) was added to each vessel and then sealed. Pressure and temperature were monitored continuously in the "master" vessel. The vessels were heated in a microwave oven from room temperature to 200° C. for 15 min and then held at 200° C. for 10 min. After cooling to room temperature, the vessels were removed and vented. The samples were diluted to a final volume of 50 mL and transferred to sample containers for ICP-AES analysis. The ICP-AES is equipped with an argon purged optical path to allow analysis of elemental emission lines in the range of 130 nm to 773 nm. All lines were acquired at 1425 W plasma power. Nebulizer flowrate was 2 mL/min sample, 0.8 L/min argon, auxiliary flowrate of 1.2 L/min argon and coolant flowrate of 12 L/min argon. Calibration of the ICP-AES was done by dilution of commercial 1000 ppm standards diluted with nitric acid solution (1 vol conc. nitric acid with 4 vol deionized water).

Prior to ICP-AES, BET and TPD analysis, both pre- and post-reaction catalyst materials were calcined in air. The calcination protocol entailed heating in air using a muffle furnace to 550° C. at 3° C./min, holding for 4 h, and then passively cooling to ambient temperature. Molybdenum and phosphorus content of the fresh and reacted Mo-HPA/TiO$_2$ catalyst materials were analyzed via ICP-AES. Aliquots of nominal 0.1 and 0.15 g were weighed into Teflon test tubes and digested with a combination of nitric, perchloric, and hydrofluoric acids. The digested samples were then diluted to a final mass of 200 g and then analyzed by ICP-AES. The instrument was calibrated prior to analysis with commercial standard solutions. Calibration checks were run before the samples and after at least every ten samples to ensure there was no instrumental drift over the course of the analysis. The catalyst surface area was measured via nitrogen physisorption at −196° C. using a Quadrasorb SI Instrument (Quantachrome Instruments). Prior to the measurement, samples were degassed at 350° C. under vacuum overnight. The surface area was calculated using multi-point Brunauer-Emmett-Teller (BET) from a relative pressure range of P/PO=0.01-0.06. Ammonia temperature-programmed desorption (TPD) was used to determine catalyst acidity using a micro-flow reactor system (Altamira Instruments 390) equipped with a thermal conductivity detector. Catalyst samples (~200 mg) were pretreated by heating in helium to 500° C. for 30 min, and then cooled to 120° C. in He flow. Next, ammonia adsorption consisted of flowing 10 vol % NH$_3$/He for 30 min at 120° C., followed by flushing with He. The TPD was performed by heating at 30° C./min from 120-600° C., with a 30 min hold at 600° C. The gas flowrate in all steps was 25 SCCM. A 5 mL sample loop was used to calibrate the thermal conductivity detector (TCD) response for NH$_3$ and quantify the amount of NH$_3$ desorbed from the catalysts.

Note that while many examples included herein are focused on biomass, the methods, devices, and systems described herein may have other applications and may be used in many industries. Many of the examples presented herein related to pine pyrolysis, but pyrolysis using any type of fuel (municipal solid waste-derived biomass residues, forest residues, corn stover are examples) may be utilized in the processes described herein.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device for upgrading a pyrolysis vapor, the device comprising:
   a filter element; and
   a catalyst, wherein:
   the filter element removes particulate from a stream comprising the pyrolysis vapor to form a filtered stream of the pyrolysis vapor, the catalyst receives the filtered stream, the catalyst comprises a heteropolyacid, the catalyst reacts with a compound in the filtered stream to form an upgraded stream of the pyrolysis vapor, further comprising an upgraded compound, and both the filter element and the catalyst are substantially stable at temperatures up to about 500° C.

2. The device of claim 1, wherein the filter element is selected from the group consisting of a ceramic and a metal.

3. The device of claim 2, wherein the ceramic is selected from the group consisting of an oxide, a carbide, a nitride, and a phosphide.

4. The device of claim 3, wherein the oxide is selected from the group consisting of an alumina, a titania, a zirconia, and a silica.

5. The device of claim 3, wherein the carbide is selected from the group consisting of silicon, titanium, and zinc.

6. The device of claim 1, wherein the catalyst is selected from the group consisting of a ring-opening catalyst, a metal oxide, a zeolite, platinum, palladium, iridium, and rhodium.

7. The device of claim 1, wherein the catalyst is positioned on a support.

8. A system for upgrading a pyrolysis vapor, the system comprising:

a catalytic hot-gas filter (CHGF) configured to receive an inlet stream comprising at a pyrolysis vapor, wherein:

the CHGF comprises a filter element and a catalyst, the filter element is configured to remove particulate from the inlet stream comprising a pyrolysis vapor to form a filtered stream of the pyrolysis vapor, the catalyst comprises a heteropolyacid, the catalyst is configured to receive the filtered stream and react a compound in the filtered stream to form an upgraded stream of the pyrolysis vapor, further comprising an upgraded compound, and both the filter element and the catalyst are configured to be substantially stable at temperatures up to about 500° C.

9. The system of claim 8, further comprising a pyrolyzer configured to convert a feed stream to the inlet stream comprising an untreated pyrolysis vapor.

10. The system of claim 9, wherein the pyrolyzer comprises at least one of a fluidized bed, a moving-bed, a circulating fluidized bed, a bubbling bed, an auger/screw system, an ablative reactor, a vacuum reactor, or an entrained flow reactor.

11. The system of claim 8, further comprising:

a fractional condensation train (FCT) comprising, in series:

a passive-cooler condenser;

an electrostatic precipitator;

an aqueous condenser; and a coalescing filter, wherein:

the FCT is configured to receive the upgraded stream to produce at least one pyrolysis oil.

* * * * *